(12) United States Patent
Arkko et al.

(10) Patent No.: US 11,228,429 B2
(45) Date of Patent: Jan. 18, 2022

(54) COMMUNICATION WITH SERVER DURING NETWORK DEVICE DURING EXTENSIBLE AUTHENTICATION PROTOCOL—AUTHENTICATION AND KEY AGREEMENT PRIME PROCEDURE

(71) Applicant: Telefonaktiebolaget LM Ericsson (publ), Stockholm (SE)

(72) Inventors: Jari Arkko, Kauniainen (FI); Karl Norrman, Stockholm (SE); Vesa Torvinen, Sauvo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 420 days.

(21) Appl. No.: 16/303,346

(22) PCT Filed: Oct. 30, 2018

(86) PCT No.: PCT/EP2018/079689
§ 371 (c)(1),
(2) Date: Nov. 20, 2018

(87) PCT Pub. No.: WO2019/086444
PCT Pub. Date: May 9, 2019

(65) Prior Publication Data
US 2021/0226781 A1    Jul. 22, 2021

Related U.S. Application Data

(60) Provisional application No. 62/578,710, filed on Oct. 30, 2017.

(51) Int. Cl.
*H04L 9/08*     (2006.01)
*H04L 9/30*     (2006.01)
(Continued)

(52) U.S. Cl.
CPC ............ *H04L 9/0844* (2013.01); *H04L 9/085* (2013.01); *H04L 9/0869* (2013.01);
(Continued)

(58) Field of Classification Search
CPC ..... H04L 9/0844; H04L 9/085; H04L 9/0869; H04L 9/3066; H04L 9/3242; H04L 9/3271
(Continued)

(56) References Cited

U.S. PATENT DOCUMENTS

| | | | | |
|---|---|---|---|---|
| 5,199,070 A | * | 3/1993 | Matsuzaki | ............ H04L 9/3013 380/30 |
| 2006/0153370 A1 | * | 7/2006 | Beeson | ................ H04L 9/3073 380/30 |

(Continued)

FOREIGN PATENT DOCUMENTS

WO    WO 2016/137374 A1    9/2016

OTHER PUBLICATIONS

Tsay et al, "Computational Security Analysis of the UMTS and LTE Authentication and Key Agreement Protocols," Department of Telematics, Norwegian University of Sciences and Technology, NTNU, Jan. 8, 2013, 26 pages.

(Continued)

*Primary Examiner* — Bryan F Wright
(74) *Attorney, Agent, or Firm* — Sage Patent Group

(57) ABSTRACT

A communication device for communication with a network device during EAP-AKA'. The communication device is operative to receive a first Perfect Forward Secrecy, PFS, parameter value and at least one attribute value indicating a choice of a Diffie-Hellman group from the network device. The communication device is also operative to receive a cipher key, CK, and an integrity key, IK. Generate a modified cipher key, CK', and a modified integrity key, IK' based (Continued)

on CK, IK and an access network identity. Operations include calculating a second PFS parameter value. Send the second PFS parameter value to the network device. Calculate a third PFS parameter value. Derive, using a Pseudo-random function, a key based on the third PFS parameter value, CK', IK' and an identity associated with the communication device. A network device, methods, further communication devices, a server, computer programs and a computer program product are also disclosed.

18 Claims, 12 Drawing Sheets

(51) Int. Cl.
  *H04L 9/32*    (2006.01)
  *H04W 12/04*   (2021.01)
  *H04W 12/06*   (2021.01)
(52) U.S. Cl.
  CPC .......... *H04L 9/3066* (2013.01); *H04L 9/3242* (2013.01); *H04L 9/3271* (2013.01); *H04W 12/04* (2013.01); *H04W 12/06* (2013.01)
(58) Field of Classification Search
  USPC ......................................................... 713/171
  See application file for complete search history.

(56) References Cited

U.S. PATENT DOCUMENTS

| | | | | |
|---|---|---|---|---|
| 2006/0280300 | A1* | 12/2006 | Rossini | H04L 9/0841 380/44 |
| 2015/0180653 | A1* | 6/2015 | Nix | H04L 9/3247 380/259 |
| 2016/0255070 | A1 | 9/2016 | Naslund et al. | |
| 2019/0268335 | A1* | 8/2019 | Targali | H04L 9/3236 |
| 2021/0058776 | A1* | 2/2021 | Nair | H04W 12/72 |
| 2021/0226781 | A1* | 7/2021 | Arkko | H04L 9/0869 |

OTHER PUBLICATIONS

3GPP TS 24.302 V14.5.0, "$3^{rd}$ Generation Partnership Project; Technical Specification Group Core Network and Terminals; Access to the 3GPP Evolved Packet Core (EPC) via non-3GPP access networks; Stage 3 (Release 14)," Technical Specification dated Sep. 2017, 156 pages.
3GPP TS 33.102 V14.1.0, "$3^{rd}$ Generation Partnership Project; Technical Specification Group Services and System Aspects; 3G Security; Security architecture (Release 14)," Technical Specification dated Mar. 2017, 77 pages.
3GPP TS 33.402 V14.3.0, "$3^{rd}$ Generation Partnership Project; Technical Specification Group Services and System Aspects; 3GPP System Architecture Evolution (SAE); Security aspects of non-3GPP accesses (Release 14)," Technical Specification dated Sep. 2017, 72 pages.
Beekman et al, "Breaking Cell Phone Authentication: Vulnerabilities in AKA, IMS, and Android," University of California—Berkeley, $7^{th}$ USENIX Workshop on Offensive Technologies, Aug. 13, 2013, 26 pages.
Arkko et al, "A USIM compatible 5G AKA protocol with perfect forward secrecy," Aug. 21, 2015, 5 pages.
Krawczyk et al., "HMAC: Keyed-Hashing for Message Authentication," Network Working Group Request for Comments: 2104, Feb. 1997, 11 pages.
Bradner, "Key words for use in RFCs to Indicate Requirement Levels," Network Working Group Request for Comments: 2119, Mar. 1997, 3 pages.
Haverinen et al., "Extensible Authentication Protocol Method for Global System for Mobile Communications (GSM) Subscriber Identity Modules (EAP-SIM)," Network Working Group Request for Comments: 4186, Jan. 2006, 79 pages.
Arkko et al., "Extensible Authentication Protocol Method for $3^{rd}$ Generation Authentication and Key Agreement (EAP-AKA)," Network Working Group Request for Comments: 4187, Jan. 2006, 79 pages.
Aboba et al., "The Network Access Identifier," Network Working Group Request for Comments: 4282, Dec. 2005, 16 pages.
Arkko et al., "Improved Extensible Authentication Protocol Method for $3^{rd}$ Generation Authentication and Key Agreement (EAP-AKA)," Network Working Group Request for Comments: 5448, May 2009, 29 pages.
Kaufman et al., "Internet Key Exchange Protocol Version 2 (IKEv2)," IETF Request for Comments: 7296, Oct. 2014, 142 pages.
Langley et al., "Elliptic Curves for Security," IRTF Request for Comments: 7748, Jan. 2016, 22 pages.
Nir et al., "Curve25519 and Curve448 for the Internet Key Exchange Protocol Version 2 (IKEv2) Key Agreement," IETF Request for Comments: 8031, Dec. 2016, 8 pages.
Cotton et al., "Guidelines for Writing an IANA Considerations Section in RFCs," IETF Request for Comments: 8126, Jun. 2017, 47 pages.
Diffie, "Authentication and Authenticated Key Exchanges," Designs, Codes and Cryptography, vol. 2, Issue 2, Mar. 6, 1992, 21 pages.
Scahill et al., "The Great SIM Heist: How Spies Stole the Keys to the Encryption Castle," The Intercept, https://firstlook.org/theintercept/2015/02/19/great-sim-heist/[Jul. 6, 2015 13:12:20] Feb. 19, 2015, 18 pages.
Choudhary et al, "3GPP AKA Protocol: Simplified Authentication Process," International Journal of Advanced Research in Computer Science and Software Engineering, vol. 4, Issue 12, Dec. 2014, 4 pages.
International Search Report and Written Opinion of the International Searching Authority, PCT/EP2018/079689, dated Jan. 17, 2019, 14 pages.
Hyeran Mun et al., 3G-WLAN Interworking: Security Analysis and New Authentication and Key Agreement based on EAP-AKA, Korea Advanced Institute of Science and Technology, 119, Munjiro, Yuseong-gu, Dajeon, 305-732, South Korea, Apr. 22, 2009, IEEE, XP031471049, 8 Pages.

* cited by examiner

```
 0 1 2 3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| AT_RAND | Length = 5 |           Reserved            |
+-+-+-+-+-+-+-+-+-+-+-+-+-+-+-+-+-+-+-+-+-+-+-+-+-+-+-+-+-+-+-+-+
|                                                               |
|                             RAND                              |
|                                                               |
|                                                               |
+-+-+-+-+-+-+-+-+-+-+-+-+-+-+-+-+-+-+-+-+-+-+-+-+-+-+-+-+-+-+-+-+
```

Fig. 4

```
 0 1 2 3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| AT_AUTN | Length = 5 |           Reserved            |
+-+-+-+-+-+-+-+-+-+-+-+-+-+-+-+-+-+-+-+-+-+-+-+-+-+-+-+-+-+-+-+-+
|                                                               |
|                             AUTN                              |
|                                                               |
|                                                               |
+-+-+-+-+-+-+-+-+-+-+-+-+-+-+-+-+-+-+-+-+-+-+-+-+-+-+-+-+-+-+-+-+
```

Fig. 5

```
 0 1 2 3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| AT_RES  |  Length   |         RES Length            |
+-+-+-+-+-+-+-+-+-+-+-+-+-+-+-+-+-+-+-+-+-+-+-+-+-+-+-+-+-+-+-+-+
|                                                               |
|                             RES                               |
|                                                               |
|                                                               |
+-+-+-+-+-+-+-+-+-+-+-+-+-+-+-+-+-+-+-+-+-+-+-+-+-+-+-+-+-+-+-+-+
```

Fig. 6

```
 0 1 2 3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| AT_MAC  | Length = 5 |           Reserved            |
+-+-+-+-+-+-+-+-+-+-+-+-+-+-+-+-+-+-+-+-+-+-+-+-+-+-+-+-+-+-+-+-+
|                                                               |
|                             MAC                               |
|                                                               |
|                                                               |
+-+-+-+-+-+-+-+-+-+-+-+-+-+-+-+-+-+-+-+-+-+-+-+-+-+-+-+-+-+-+-+-+
```

Fig. 7

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| AT_KDF_INPUT  |    Length     | Actual Network Name Length    |
+-+-+-+-+-+-+-+-+-+-+-+-+-+-+-+-+-+-+-+-+-+-+-+-+-+-+-+-+-+-+-+-+
|                                                               |
.                         Network Name                          .
.                                                               .
|                                                               |
+-+-+-+-+-+-+-+-+-+-+-+-+-+-+-+-+-+-+-+-+-+-+-+-+-+-+-+-+-+-+-+-+
```
Fig. 8

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    AT_KDF     |    Length     |    Key Derivation Function    |
+-+-+-+-+-+-+-+-+-+-+-+-+-+-+-+-+-+-+-+-+-+-+-+-+-+-+-+-+-+-+-+-+
```
Fig. 9

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    AT_GX      |    Length     |         Value ...             |
+-+-+-+-+-+-+-+-+-+-+-+-+-+-+-+-+-+-+-+-+-+-+-+-+-+-+-+-+-+-+-+-+
```
Fig. 10

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    AT_GY      |    Length     |         Value ...             |
+-+-+-+-+-+-+-+-+-+-+-+-+-+-+-+-+-+-+-+-+-+-+-+-+-+-+-+-+-+-+-+-+
```
Fig. 11

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  AT_PUB_ECDHE |    Length     |         Value ...             |
+-+-+-+-+-+-+-+-+-+-+-+-+-+-+-+-+-+-+-+-+-+-+-+-+-+-+-+-+-+-+-+-+
```
Fig. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| AT_KDF        | Length        |    Key Derivation Function    |
+-+-+-+-+-+-+-+-+-+-+-+-+-+-+-+-+-+-+-+-+-+-+-+-+-+-+-+-+-+-+-+-+
```

Fig. 13

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| AT_KDF_PFS    | Length        |    Key Derivation Function    |
+-+-+-+-+-+-+-+-+-+-+-+-+-+-+-+-+-+-+-+-+-+-+-+-+-+-+-+-+-+-+-+-+
```

Fig. 14

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| AT_MAC_DH    | Length = 5     |           Reserved            |
+-+-+-+-+-+-+-+-+-+-+-+-+-+-+-+-+-+-+-+-+-+-+-+-+-+-+-+-+-+-+-+-+
|                                                               |
|                             MAC                               |
|                                                               |
|                                                               |
+-+-+-+-+-+-+-+-+-+-+-+-+-+-+-+-+-+-+-+-+-+-+-+-+-+-+-+-+-+-+-+-+
```

Fig. 15

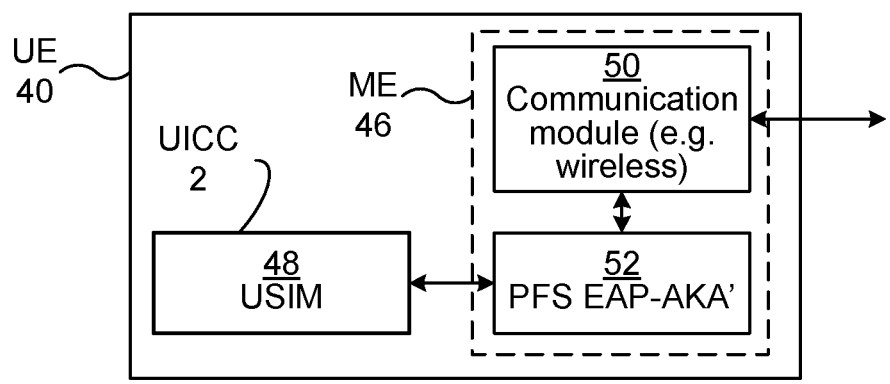

Fig. 17

COMMUNICATION WITH SERVER DURING NETWORK DEVICE DURING EXTENSIBLE AUTHENTICATION PROTOCOL—AUTHENTICATION AND KEY AGREEMENT PRIME PROCEDURE

CROSS REFERENCE TO RELATED APPLICATIONS

This application is a 35 U.S.C. § 371 national stage application of PCT International Application No. PCT/EP2018/079689, filed on Oct. 30, 2018, which claims the benefit of U.S. Provisional Patent Application Ser. No. 62/578,710, filed on Oct. 30, 2017, the disclosures and content of which are incorporated by reference herein in their entireties.

TECHNICAL FIELD

The disclosure herein relates to communication devices, a network device and a server which are operative during EAP-AKA' (Extensible Authentication Protocol-Authentication and Key Agreement prime). The disclosure also relates to methods, computer programs and computer program product therefore.

BACKGROUND

Data transferred over communication networks is becoming increasingly sensitive. Communication networks, such as mobile, wireless and fixed communication networks, are nowadays more and more frequently used for e.g. various economical and business-related transactions, control of cyber-physical systems, etc. In for instance mobile communications it is important that the communication network and user equipment (UE) mutually authenticate each other and are able to encrypt exchanged traffic data, where both of these security services are critically dependent on secure key management.

AKA (Authentication and Key Agreement)

Current 3GPP systems use (U)SIM pre-shared key based protocols to authenticate subscribers. AKA is based on challenge-response mechanisms and symmetric cryptography. AKA typically runs in a UMTS Subscriber Identity Module (USIM) or a CDMA2000 (Removable) User Identity Module ((R)UIM). In contrast to its earlier GSM counterparts, $3^{rd}$ generation AKA in 3GPP (Third Generation Partnership Project) provides long key lengths and mutual authentication.

AKA, e.g. in $3^{rd}$ and $4^{th}$ generation 3GPP networks, works in the following manner:

The identity module and the home environment have agreed on a long-term, secret, shared key beforehand.

The actual authentication process starts by having the home environment produce an authentication vector, based on the secret key and a sequence number. The authentication vector contains a random part RAND, an authenticator part AUTN (Authentication Token) used for authenticating the network to the identity module, an expected result part XRES, a 128-bit session key for integrity check IK (Integrity key), and a 128-bit session key for encryption CK (Ciphering key).

The RAND and the AUTN are delivered to the identity module.

The identity module verifies the AUTN, again based on the secret key and the sequence number. If this process is successful (the AUTN is valid and the sequence number used to generate AUTN is within the correct range), the identity module produces an authentication result RES and sends it to the home environment.

The home environment verifies the correct result from the identity module. If the result is correct, IK and CK can be used to protect further communications between the identity module and the home environment.

Since the addition of replay protection and mutual authentication in the third generation 3GPP systems, there have been no published attacks that violate the security properties defined for the AKA, at least not within the assumed trust model. However, there have been attacks using a different trust model [CB2014] [MT2012]; the protocol was not designed to counter those situations. There have also been attacks against systems where AKA is used in a different setting than initially intended, e.g. [BT2013].

Many different attacks have been reported as part of revelations associated with pervasive surveillance. Some of the reported attacks involved compromising smart cards, such as attacking SIM card manufacturers and operators in an effort to compromise shared secrets stored on these cards. Such attacks are conceivable, for instance, during the manufacturing process of cards, or the transfer of cards and associated information to the operator. Since the publication of reports about such attacks, manufacturing and provisioning processes have gained much scrutiny and have improved.

However, the danger of resourceful attackers attempting to gain information about SIM cards is still a concern. They are a high-value target and concern a large number of people. Note that the attacks are largely independent of the used authentication technology. The issue is not vulnerabilities in algorithms or protocols, but rather the possibility of someone gaining unlawful access to key material. While the better protection of manufacturing and other processes is essential in protecting against this, it would be desirable to further limit the consequences of attacks when they occur.

Recent reports of compromised long term pre-shared keys used in AKA are not specific to AKA or EAP-AKA', as all security systems fail at least to some extent if key material is stolen. However, the reports [Heist2015] indicate a need to look into solutions that allow a weaker trust model, in particular for future 5G systems. It is also noted in [Heist2015] that, even if the current trust model is kept, some security can be retained in this situation by providing Perfect Forward Security (PFS) [DOW1992] for the session key. If AKA would have provided PFS, compromising the pre-shared key would not be sufficient to perform passive attacks; the attacker is, in addition, forced to be a Man-In-The-Middle (MITM) during the AKA run. Introducing PFS for authentication in 3GPP systems can be achieved by adding a Diffie-Hellman (DH) exchange. WO-20161137374-A1 and [TrustCom2015] discuss these problems and provide a solution associated with the underlying AKA method.

SUMMARY

There are however even more things that could be done to mitigate consequences of attacks, e.g. in case of a compromised share key stored on e.g. a tamper resistant smart card such as a UICC, eSIM, eUICC and iUICC etc. Such a key is for example the shared key K in $4^{th}$ generation 3GPP systems, which key is used for derivation of a cipher key, CK, and an integrity key, IK. An object of the invention is therefore to enable increased security in communications network in case a key shared between two parties becomes known to a third party.

A first aspect of the invention relates to a communication device for communication with a network device. The communication device is operative, during an Extensible Authentication Protocol-Authentication and Key Agreement Prime, EAP-AKA', procedure, to:

receive a first Perfect Forward Secrecy, PFS, parameter value and at least one attribute value indicating a choice of a Diffie-Hellman group from the network device;

receive a ciphering key, CK, and an integrity key, IK, from a Universal Subscriber Identity Module, USIM;

generate a modified ciphering key, CK', based on the CK, the IK and an access network identity;

generate a modified integrity key, IK', based on the CK, the IK and the access network identity;

calculate a second PFS parameter value;

send the second PFS parameter value to the network device;

calculate a third PFS parameter value based on the first PFS parameter value and the second PFS parameter value; and derive, using a Pseudo-random function, a key for communication between the communication device and the network device or any other network device associated with the network device, based on the third PFS parameter value, the CK', the IK' and an identity associated with the communication device.

A second aspect of the invention relates to a network device which comprises a processor and a memory, said memory comprising instructions executable by said processor, whereby said network device is operative during an EAP-AKA' procedure to:

obtain a modified ciphering key, CK', based on a ciphering key, CK, an integrity key, IK, and an access network identity;

obtain a modified integrity key, IK', based on the CK, the IK, and the access network identity;

calculate a first PFS, PFS parameter value;

send the first PFS parameter value and at least one attribute value indicating a choice of a Diffie-Hellman group to a communication device;

receive a second PFS parameter value from the communication device;

calculate a third PFS value based on the first PFS parameter value and the second PFS parameter value; and derive, using a Pseudo-random function, a key for communication between the communication device and the network device or any other network device associated with the network device, based on the third PFS parameter value, the CK', the IK' and an identity associated with the communication device.

A third aspect of the invention relates to a communication device for communication with a network device. The communication device comprises a PFS Extensible Authentication Protocol-Authentication and Key agreement prime, PFS EAP-AKA', module for, during an EAP-AKA' procedure:

receiving a ciphering key, CK, and an integrity key, IK, from a USIM;

generating a modified ciphering key, CK', based on the CK, the IK and an access network identity;

generating a modified integrity key, IK', based on the CK, the IK and the access network identity;

receiving a first PFS parameter value and at least one attribute value indicating a choice of a Diffie-Hellman group from the network device from the network device;

calculating a second PFS parameter value;

sending the second PFS parameter value to the network device;

calculating a third PFS parameter value based on the first PFS parameter value and the second PFS parameter value; and deriving, using a Pseudo-random function, a key for communication between the communication device and the network device or any other network device associated with the network device, based on the third PFS parameter value, the CK', the IK', and an identity associated with the communication device.

A fourth aspect of the invention relates to a method performed by a communication device for communication with a network device during EAP-AKA' procedure. The method comprises:

receiving a first PFS parameter value and at least one attribute value indicating a choice of a Diffie-Hellman group from the network device;

receiving a ciphering key, CK, and an integrity key, IK;

generating a modified ciphering key, CK', based on the CK, the IK and an access network identity;

generating a modified integrity key, IK', based on the CK, the IK and the access network identity;

calculating a second PFS parameter value;

sending the second PFS parameter value to the network device;

calculating a third PFS parameter value based on the first PFS parameter value and the second PFS parameter value; and deriving, using a Pseudo-random function, a key for communication between the communication device and the network device or any other network device associated with the network device, based on the third PFS parameter value, the CK', the IK' and an identity associated with the communication device.

A fifth aspect of the invention relates to a method performed by a network device during EPA-AKA' procedure. The method comprises:

obtaining a modified ciphering key, CK', based on a ciphering key, CK, an integrity key, IK, and an access network identity;

obtaining a modified integrity key, IK', based on the CK, the IK, and the access network identity;

calculating a first PFS parameter value;

sending the first PFS parameter value and at least one attribute value indicating a choice of a Diffie-Hellman group to a communication device;

receiving a second PFS parameter value from the communication device;

calculating a third PFS value based on the first PFS parameter value and the second PFS parameter value; and deriving, using a Pseudo-random function, a key for communication between the communication device and the network device or any other network device associated with the network device, based on the third PFS parameter value, the CK', the IK', and an identity associated with the communication device.

A sixth aspect of the invention relates to a computer program for a communication device in communication with a network device of a communication network. The computer program comprising computer program code which when run in the communication device, causes the communication device, during an EAP-AKA' process to:

receive a first PFS parameter value and at least one attribute value indicating a choice of a Diffie-Hellman group from the network device;

receive a ciphering key, CK, and an integrity key, IK, from a USIM;

generate a modified ciphering key, CK', based on the CK, the IK and an access network identity;

generate a modified integrity key, IK', based on the CK, the IK and the access network identity;

calculate a second PFS parameter value;

send the second PFS parameter value to the network device;

calculate a third PFS parameter value based on the first PFS parameter value and the second PFS parameter value; and derive, using a Pseudo-random function, a key for communication between the communication device and the network device or any other network device associated with the network device, based on the third PFS parameter value, the CK', the IK', and an identity associated with the communication device.

A seventh aspect of the invention relates to a computer program for a network device of a first or second communication network. The computer program comprises computer program code which when run in the network device, causes the network device, during an Extensible Authentication Protocol-Authentication and Key agreement prime, EAP-AKA', procedure to:

obtain a modified ciphering key, CK', based on a ciphering key, CK, an identity key, IK, and an access network identity;

obtain a modified integrity key, IK', based on the CK, the IK, and the access network identity;

calculate a first PFS parameter value;

send the first PFS parameter value and at least one attribute value indicating a choice of a Diffie-Hellman group to a communication device;

receive a second PFS parameter value from the communication device;

calculate a third PFS value based on the first PFS parameter value and the second PFS parameter value; and derive, using a Pseudo-random function, a key for communication between the communication device and the network device or any other network device associated with the network device, based on the third PFS parameter value, the CK', the IK', and an identity associated with the communication device.

An eighth aspect of the invention relates to a computer program product for enhancing the communication security of a communication device in communication with a network device of a communication network, the computer program product comprising a computer readable storage medium with computer program code according to the sixth or seventh aspects above.

A ninth aspect of the invention relates to a method performed by a communication device during an EAP-AKA' procedure with a server. The method comprises:

receiving, from the server, a message comprising a public key of a public-private key pair for the server, and an attribute indicating
  a used or desired key generation function associated with the public key for the server, and
  a used or desired Elliptic Curve Diffie-Hellman Ephemeral group related to the public key for the server;

receiving a ciphering key, CK, and an integrity key, IK, from a USIM;

generating a modified ciphering key, CK', and a modified integrity key, IK', based on the CK, IK and an access network identity;

generating a public-private key pair for the communication device;

generating a shared secret based on a private key of the public-private key pair for the communication device and the public key for the server;

sending the public key for the communication device to the server in order to enable the server to generate the shared secret through generation of the shared secret based on the public key for the communication device and a private key of the public-private key pair for the server; and deriving a key using a pseudo-random function for communication between the communication device and the server, based on the shared secret, the CK', the IK', an identity associated with the communication device and a value representing a choice of a key derivation function.

A tenth aspect of the invention relates to a communication device, wherein the communication device comprises a processor and a memory. The memory comprises instructions executable by the processor, whereby said communication device is operative, during an EAP-AKA' procedure with a server, to:

receive, from a server, a first message comprising a public key of a public-private key pair for the server, and an attribute indicating
  a used or desired key generation function associated with the public key for the server and
  a used or desired Elliptic Curve Diffie-Hellman Ephemeral group related to the public key for the server;

receive a ciphering key, CK, and an integrity key, IK, from a USIM;

generating a modified ciphering key, CK', and a modified integrity key, IK', based on the CK, IK and an access network identity;

generate a public-private key pair for the communication device;

generate a shared secret based on a private key of the public-private key pair for the communication device and the public key for the server;

send the public key for the communication device to the server in order to enable the server to generate the shared secret through generation of the shared secret based on the public key for the communication device and a private key of the public-private key pair for the server; and derive a key using a pseudo-random function for communication between the communication device and the server, based on the shared secret, the CK', the IK', an identity associated with the communication device and a value representing a choice of a key derivation function.

An eleventh aspect of the invention relates to a server comprising a processor and a memory. The memory comprises instructions executable by said processor, whereby said server is operative during an EAP-AKA' procedure to:

obtain a modified ciphering key, CK', and a modified integrity key, IK', based on a ciphering key, CK, and an integrity key, IK, and an access network identity;

generate a public-private key pair for the server;

send a public key of the public-private key pair for the server to a communication device and an attribute indicating a used or desired key generation function associated with the public key for the server, and a used or desired Elliptic Curve Diffie-Hellman Ephemeral group related to the public key for the server;

receive from the communication device a public key of a public-private key pair for the communication device;

generate a shared secret based on a private key of the public-private key pair for the server and the received public key for the communication device;

derive a key using a pseudo-random function for communication between the communication device and the server, based on the shared secret, the CK', the IK', an identity associated with the communication device and a value representing a choice of a key derivation function.

A twelfth aspect of the invention relates to a method performed by a server during an EAP-AKA' procedure with a communication device: The method comprises:

obtaining a modified ciphering key, CK', and a modified integrity key, IK', based on a ciphering key, CK, and an integrity key, IK, and an access network identity;

generating a public-private key pair for the server;

sending, to a communication device, a public key of the public-private key pair for the server and an attribute indicating a used or desired key generation function associated with the public key for the server, and a used or desired Elliptic Curve Diffie-Hellman Ephemeral group related to the public key for the server;

receiving from the communication device a public key of a public-private key pair for the communication device;

generating a shared secret based on a private key of the public-private key pair for the server and the received public key for the communication device;

deriving a key using a pseudo-random function for communication between the communication device and the server, based on the shared secret, the CK', the IK', an identity associated with the communication device and a value representing a choice of a key derivation function.

The communication device is in an embodiment of the first and third aspects a user equipment or an embedded telematics unit in a vehicle or an embedded telematics unit in a robot.

The third PFS parameter value is in an embodiment of the first to fifth aspects a Diffie-Hellman value.

The first PFS parameter value is in an embodiment of the first to fifth aspects a public key of a public-private key pair for the network device and the second PFS parameter value is in that embodiment a public key of a public-private key pair for the communication device. In such an embodiment, the communication device may be operative to generate the third PFS parameter value based (also) on a private key of the public-private key pair for the communication device.

In an embodiment of the first to fifth and ninth and twelfth aspects, the identity associated with the communication device is a Network Access Identifier, NAI, or a part of the NAI. In an alternative embodiment to the preceding embodiment of the first to fifth aspects, the identity associated with the communication device is an International Mobile Subscriber Identity, IMSI.

In an embodiment of the first and third and fifth aspects, the communication device is operative to derive the key also based on an ASCII string representing an EAP-AKA' value. The ASCII string may in such an embodiment be eight or twelve characters long. In an embodiment of the ninth and twelfth aspects, the ASCII string is twelve characters long and indicates a choice of a KDF.

The key is in an embodiment of the first and second aspects derived with an input value to the pseudo-random function, which may be PRF', said input value being a concatenation of the modified integrity key, the modified ciphering key, the third PFS parameter value, the EAP-AKA' value and the identity associated with the communication device.

The at least one attribute value also indicates in an embodiment of the first to fifth aspects a key derivation function, KDF.

The Diffie-Hellman group is in an embodiment of the first to fifth aspects a 1024-bit MODP group specified in Appendix B.2 of IETF RFC 7296.

The Diffie-Hellman group is in another embodiment of the first to fifth aspects an Elliptic Curve Diffie-Hellman Ephemeral group. In such an embodiment, the Diffie-Hellman group may be a Curve25519 group as specified in IETF RFC 8031.

In an embodiment of the first and third and fourth aspects, the communication device is operative to calculate the second PFS parameter value and send the second PFS parameter value to the network device each time the communication device performs the EAP-AKA' procedure.

In an embodiment of the first and fourth aspects, the communication device is operative to receive from the network device an attribute value indicating use of a Message Authentication Code applicable for PFS parameter negotiation in EAP-AKA' and wherein the attribute value indicates that the Message Authentication Code has been calculated over a whole Extensible Authentication Protocol, EAP, packet containing an EAP header, an EAP-AKA' header and attribute values including the first PFS parameter value.

In an embodiment of the first aspect, the communication device is operative to:

receive an EAP-Request/Identity message from the network device, and send the identity associated with the communication device to the network device in an EAP-Response/Identity message.

The at least two attributes are in an embodiment of the first aspect received from the network device, wherein each one of the attributes indicates both a choice of a Diffie-Hellman group and key derivation function for the derivation of the key.

The identity associated with the communication device is in an embodiment of the first aspect sent in an AT_IDENTITY attribute in an EAP-Response/AKA-Identity message.

A communication device comprises in an embodiment of the first aspect a processor and a memory, said memory comprising instructions executable by the processor, whereby said communication device is operative to:

receive the first PFS parameter value from the network device;

receive the CK and the IK from the USIM;

generate the CK' based on the CK, the IK and the access network identity;

generate the IK' based on the CK, the IK and the access network identity;

calculate the second PFS parameter value;

send the second PFS parameter value to the network device;

calculate the third PFS parameter value based on the first PFS parameter value and the second PFS parameter value; and derive, using a Pseudo-random function, the key for communication between the communication device and the network device or any other network device associated with the network device, based on the third PFS parameter value, the CK', the IK' and the identity associated with the communication device. The communication device according to this embodiment may also perform the other actions mentioned above in relation to the first aspect.

The network device is in an embodiment of the second aspect a Mobility Management Entity.

The network device is in an embodiment of the second aspect operative to send an EAP-Request/Identity message to the communication device, and receive the identity associated with the communication device in an EAP-Response/Identity message.

The network device is in an embodiment of the second aspect operative to send the identity associated with the communication device to a Home Subscriber Server.

The network device is in an embodiment of the second aspect operative to receive CK' and IK' from the Home Subscriber Server.

In an embodiment of the second aspect, at least two attributes are generated and sent to the communication device, which attributes indicate both a choice of a Diffie-Hellman group and key derivation function for the derivation of the key for each one of the attributes.

The network device according an embodiment of the second and fifth aspects, is operative to, before the second PFS parameter value has been received from the communication device, derive a second key based on only the CK', the IK', the EAP-AKA' attribute value and the identity associated with the communication device. In such an embodiment, the network device may be operative to derive an authentication key from the second key, and generate an attribute value indicating the use of the message authentication code applicable for PFS parameter negotiation in EAP-AKA', and including that attribute value in a first EAP-Request/AKA'-Challenge message sent from the network device to the communication device.

The PFS EAP-AKA', module is in an embodiment of the third aspect operative to generate the third PFS parameter value based on a private key of the public-private key pair for the communication device.

The PFS EAP-AKA' module is in an embodiment of the third aspect configured to: receive from the network device an attribute value indicating use of the message authentication code applicable for PFS parameter negotiation in EAP-AKA' and wherein the attribute value indicates that a Message Authentication Code has been calculated over a whole Extensible Authentication Protocol, EAP, packet containing an EAP header, an EAP-AKA' header and attribute values including the first PFS parameter value.

The CK and IK are received from a USIM in an embodiment of the method according to the fourth aspect.

The network device is in an embodiment of the second and fifth aspects operative to calculate a Message Authentication Code over a whole EAP packet containing an EAP header, an EAP-AKA' header and attribute values including the first PFS parameter value; and send, to the communication device, an attribute value indicating use of the message authentication code applicable for PFS parameter negotiation in EAP-AKA'.

The message is in an embodiment of the ninth aspect an EAP-Request/AKA'-Challenge.

The Elliptic Curve Diffie-Hellman Ephemeral group is in an embodiment of the ninth and twelfth aspects a Curve25519 group as specified in IEIF RFC 8031.

In an embodiment of the ninth aspect, the method comprises generating and sending the public key for the communication device to the server each time the communication device performs the EAP-AKA' procedure.

In an embodiment of the ninth aspect, the method comprises receiving a Message Authentication Code attribute from the server, where the Message Authentication Code attribute protects the public key for the server and the attribute that indicates a used or desired key generation function associated with the public key and a used or desired Elliptic Curve Diffie-Hellman Ephemeral group related to the public key for the server.

In an embodiment of the ninth aspect, the method comprises receiving an EAP-Request/Identity message from the server, and sending the identity to the server in an EAP-Response/Identity message.

In an embodiment of the ninth aspect, at least two attributes are received from the server, wherein each one of the attributes indicates both a choice of an Elliptic Curve Diffie-Hellman Ephemeral group and key derivation function for the derivation of the key.

In an embodiment of the twelfth aspect, the method comprises sending a Message Authentication Code attribute to the communication device, where the Message Authentication Code attribute protects the public key for the server and the attribute that indicates a used or desired key generation function associated with the public key and a used or desired Elliptic Curve Diffie-Hellman Ephemeral group related to the public key for the server.

In an embodiment of the twelfth aspect, the method comprises sending an EAP-Request/Identity message to the communication device, and receiving the identity associated with the communication device in an EAP-Response/Identity message from the communication device.

In an embodiment of the twelfth aspect, at least two attributes are sent by the server to the communication device, wherein each one of the at least two attributes indicates both a choice of an Elliptic Curve Diffie-Hellman Ephemeral group and key derivation function for the derivation of the key.

Hereby is achieved through at least some of the aspects and their embodiments that a large portion of the current structure of 3GPP (Third Generation Partnership Project) interfaces may be re-used while still increasing security, with the rationale that this will make the construction more easily adopted. For example, no changes to the interface between a Universal Subscriber Identification Module (USIM) and the mobile terminal is needed, i.e. with 3GPP terminology the interface between the Mobile Equipment (ME) and the USIM is needed (the ME is a part of the UE). As a consequence, there is no need, or at least a decreased need, to roll out new credentials to existing subscribers associated with "leaked" shared keys.

An effect of at least some embodiments enables mutual securer authentication between a server and peer which utilizes EAP-AKA', and establishes keying material for secure communication between the two. New properties are achieved for the key material, that are not present in EAP-AKA' in its original form. An extension of EAP-AKA' for PFS is therefore enabled, rather than a completely new authentication method. A solution according to at least some of the aspects of the invention and embodiments thereof may be implemented as one or a set of new, optional attributes, that are provided alongside the base attributes in EAP-AKA'. Old implementations can ignore these attributes, but their presence will nevertheless be verified as part of base EAP-AKA' integrity verification process, helping protect against bidding down attacks. Such an extension enables a maintained number of rounds necessary to complete the EAP-AKA' protocol.

An improved defence against pervasive surveillance. It should be noted that PFS and defences against passive attacks are by no means a panacea, but they can provide a partial defence that increases the cost and risk associated with pervasive surveillance.

It should also be noted that the planned 5G network architecture includes the use of the EAP framework for authentication. The default authentication method within that context will be EAP-AKA', but other methods can certainly also be run according to at least some of the embodiments disclosed herein.

BRIEF DESCRIPTION OF THE DRAWINGS

The embodiments will now be described in more detail in relation to the enclosed drawings, in which:

FIG. 5 illustrates attribute AT_AUTN, FIG. 6 illustrates attribute AT_RES, FIG. 7 illustrates attribute AT_MAC, FIG. 8 illustrates attribute AT_KDF_INPUT, FIG. 9 illustrates attribute AT_KDF, FIG. 10 illustrates an embodiment of attribute AT_GX, FIG. 11 illustrates an embodiment of attribute AT_GY, FIG. 12 illustrates an embodiment of attribute AT_PUB_ECDHE, FIG. 13 illustrates an embodiment of attribute AT_KDF_DH, FIG. 14 illustrates an embodiment of attribute AT_KDF_PFS, FIG. 15 illustrates an embodiment of attribute AT_MAC_DH, FIG. 16. schematically shows an embodiment comprising a first and second communication network as well as a communication device communicating with the first communication network, FIG. 17 shows a block schematic of a communication device comprising an identity module and a mobile equipment.

DETAILED DESCRIPTION

EAP-AKA' Protocol

Figure 1:
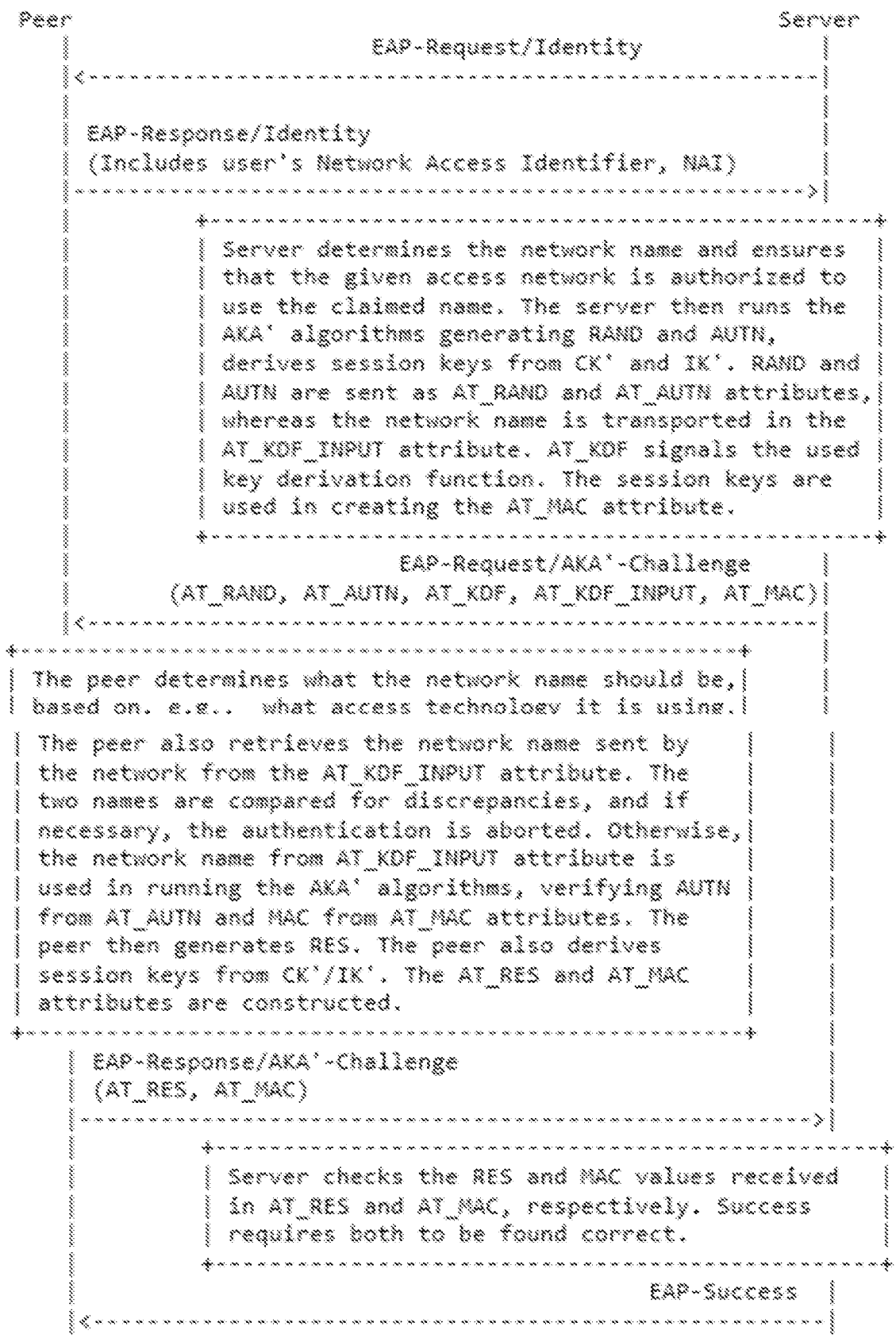
FIG. 1 illustrates the EAP-AKA' Authentication Process.

FIG. 1 describes the basic flow in the EAP-AKA' authentication process. The definition of the full protocol behaviour, along with the definition of attributes (AT) AT_RAND, AT_AUTN, AT_MAC, and AT_RES can be found in the [RFC5448] and [RFC4187].

The disclosure in this text enables an extension, which may be optional, to the EAP-AKA' authentication method. Such an extension provides Perfect Forward Secrecy (PFS) for a session key generated as a part of the authentication run in EAP-AKA'. This prevents an attacker who has gained access to the long-term pre-shared secret (normally called the key K in $3^{rd}$ and $4^{th}$ generation 3GPP systems) in a SIM card/UICC from merely passively eavesdropping the EAP-AKA' exchanges and deriving associated session keys. Attackers would thus be forced to use active attacks instead.

PFS means that even if a long term key (such as the shared key K (usually 128-bits) stored in a UICC/USIM in a communication device and in an associated home network such as in a HSS (Home Subscriber Server)/AuC (Authentication Centre)) used to establish session keys is exposed, it still does not imply that past session keys are also exposed. That is, the session key is secure in a future where the long-term key has been compromised.

The enhancements in the protocol (EAP-AKA' PFS) specified here are compatible with the signalling flow and other basic structures of both AKA and EAP-AKA'. An effect of at least some embodiments is that the enhancement as optional attributes may be implemented in such a way that legacy implementations can ignore them.

A purpose of the EAP-AKA' protocol is to achieve mutual authentication between the EAP server and peer, and to establish keying material for secure communication between the two. The enhancements brought with the embodiments of in this disclosure specifies the calculation of key material, providing new properties that are not present in key material provided by EAP-AKA' in its original form.

Figure 2:
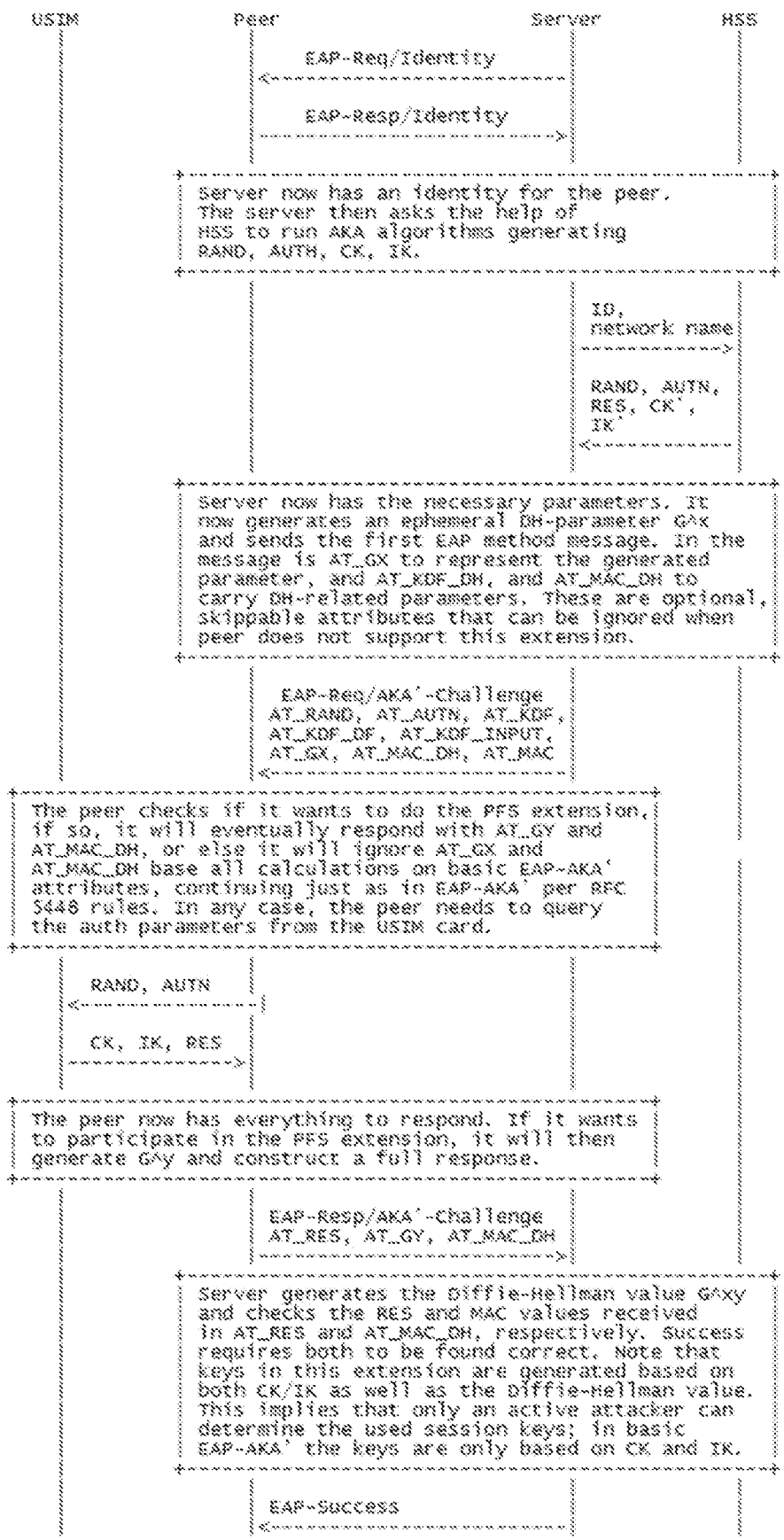
FIG. 2 shows an EAP-AKA' PFS Authentication Process according to an embodiment of the invention.
Figure 3A:
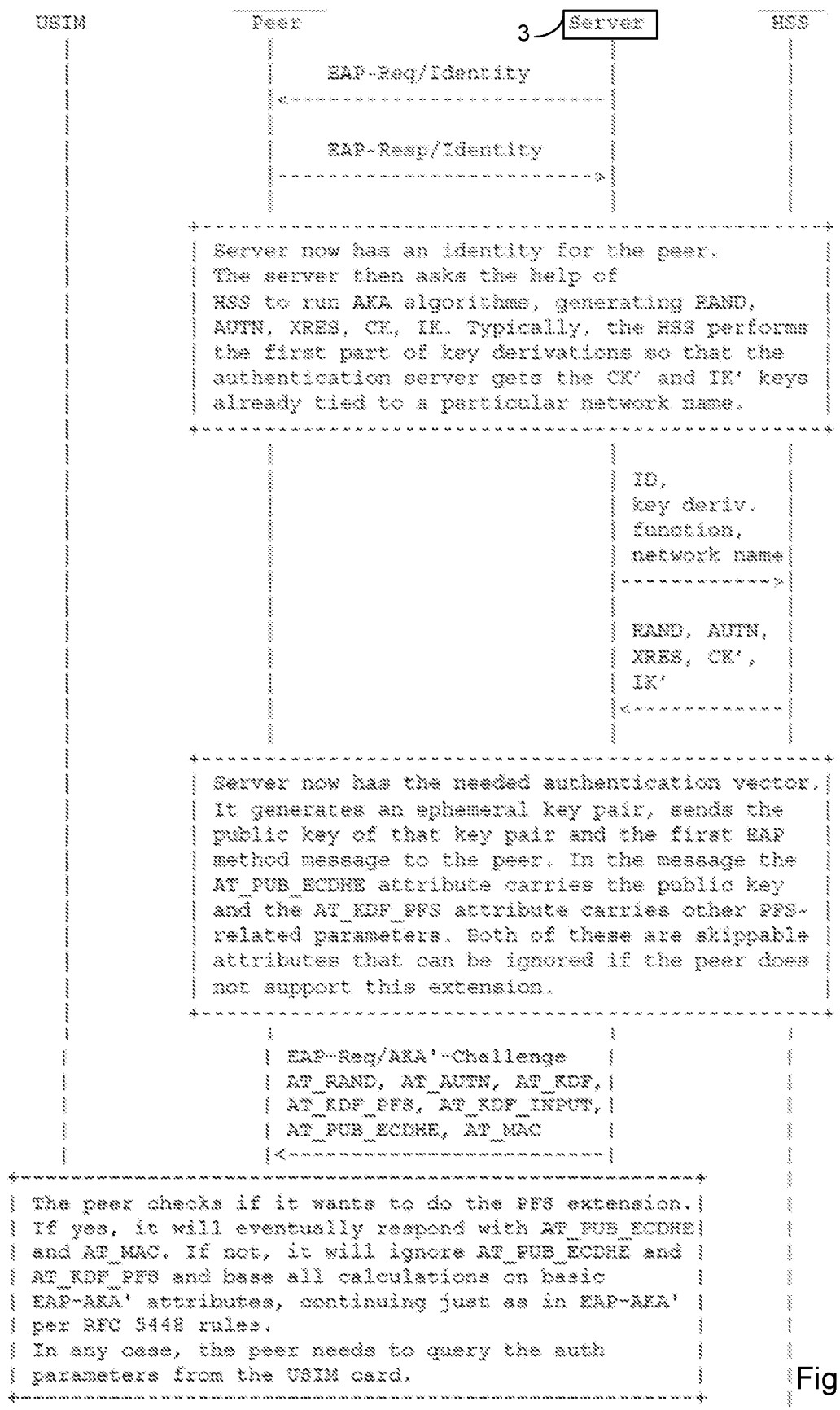
FIG. 3a shows a first part of the EAP-AKA' PFS Authentication Process according to another embodiment.
Figure 3B:
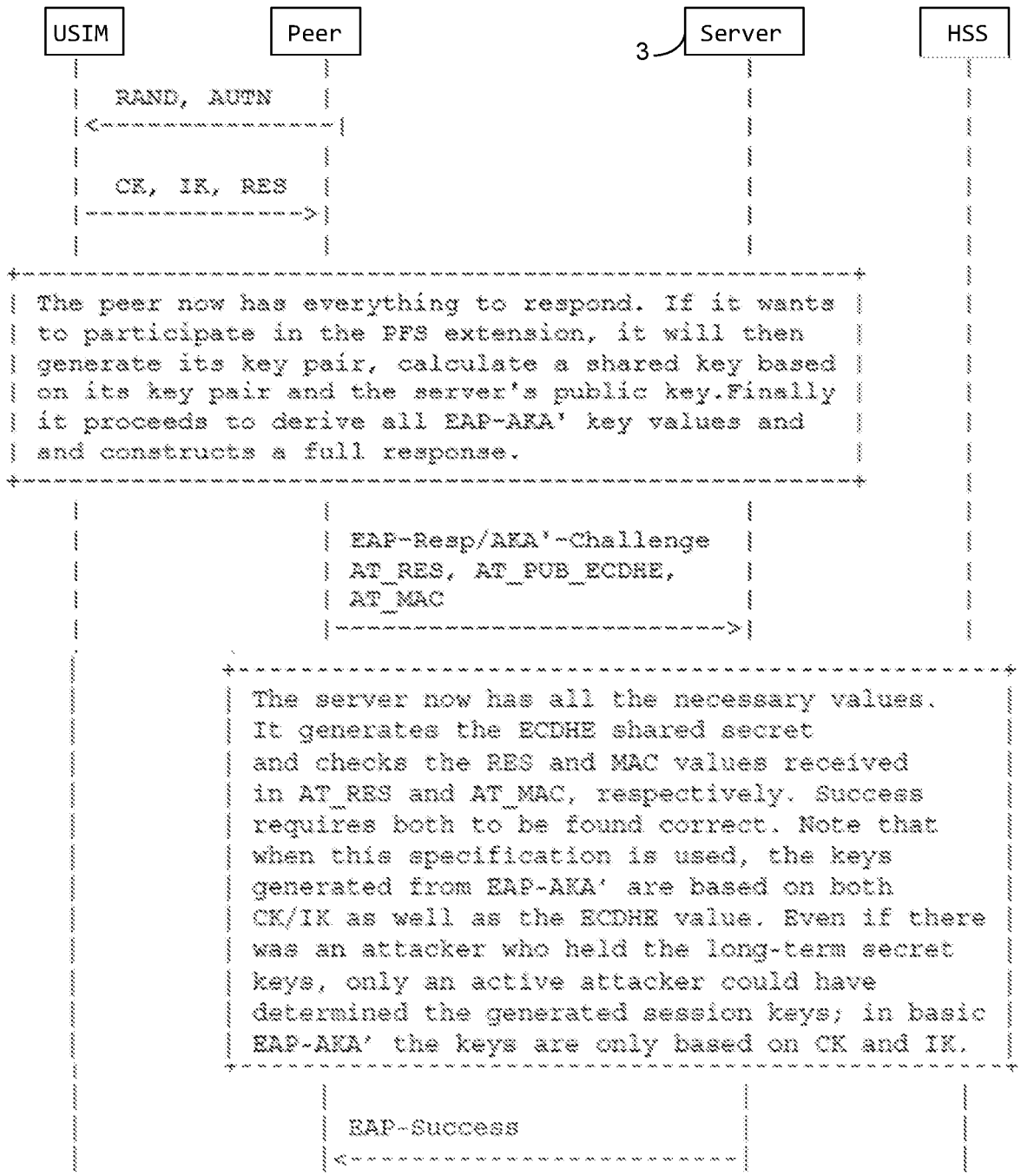
FIG. 3b shows a second part of the EAP-AKA' PFS Authentication Process according to the embodiment of FIG. 3a, FIG. 4 illustrates attribute AT_RAND.

FIGS. 2 and 3 (FIGS. 3a and 3b) discloses two embodiments of the invention and most embodiments mentioned in this detailed description are disclosed as or in relation to at least one of these embodiments.

FIG. 2 describes the overall process according to a first embodiment. Since an effect of at least some embodiments is to not require new infrastructure or credentials, the flow diagram of FIG. 2 shows also the conceptual interaction with the USIM card and an embodiment of a 3GPP authentication server, namely a Home Subscriber Server (HSS). The peer in FIG. 2 is for example a communication device such as a UE, and the server in FIG. 2 is a network device, such as a server operating as an EAP server.

As is seen in FIG. 2, the server sends an EAP-Request/Identity message to the peer. The peer responds by returning an EAP-Response/Identity. Server now has an identity for the peer. The server then asks the help of the HSS to run AKA algorithms generating RAND, AUTH, CK, IK. This is done through by sending the ID and Network Name. The HSS returns RAND, AUTN, RES, CK' and IK'. The server now has the necessary parameters. It now generates an ephemeral DH-parameter G^x and sends the first EAP method message. In the message is AT_GX to represent the generated parameter, and AT_KDF_DH, and AT_MAC_DH to carry DH-related parameters. These are optional, skippable attributes that can be ignored when peer does not support this extension. The server then sends to the peer an EAP-Req/AKA'-Challenge that comprises AT_RAND, AT_AUTN, AT_KDF, AT_KDF_DF, AT_KDF_INPUT, AT_GX, AT_MAC_DH, and AT_MAC. The peer checks if it wants to do the PFS extension. If so, the per will eventually respond with AT_GY and AT_MAC_DH, or else it will ignore AT_GX and AT_MAC_DH and base all calculations on basic EAP-AKA' attributes, continuing just as in EAP-AKA' per IETF RFC5448 rules. In any case, the peer needs to query the auth parameters from the USIM card. The peer sends the RAND and AUTN to the USIM. The USIM returns CK, IK, RES. The peer now has everything to respond. If it wants to participate in the PFS extension, it will then generate G^y and construct a full response. The peer sends to the server an EAP-Resp/AKA'-Challenge comprising AT_RES, AT_GY and AT_MAC_DH. The server generates the Diffie-Hellman value G^xy and checks the RES and MAC values received in AT_RES and AT_MAC_DH, respectively. Success requires both to be found correct. Note that keys in this extension are generated based on both CK/IK as well as the Diffie-Hellman value. This implies that only an active attacker can determine the used session keys; in basic EAP-AKA' the keys are only based on CK and IK. The last message sent in FIG. 2 is an EAP-success message from the server to the peer.

PFS parameter values in the form of a Diffie-Hellman value G^xy can be obtained as G^(xy) or G^(yx) (which will produce the same value for G^xy). The key may more particularly be obtained as a base value G raised to a random number x raised to a random number y, or, G raised to y raised to x, i.e.

(G^x)^y or (G^y)^x.

The term "random" should here be understood as including both statistically random as well as pseudo-random.

As can be seen in FIG. 2, a master key MK, which is a secure session key, may be generated based on the values x and y. The person skilled in the art will recognize that elliptic curves, and other cyclic groups where the discrete logarithm problem is hard, may also be used, Such an embodiment is described in conjunction with e.g. FIG. 3. However, for simplicity, the description of the embodiment associated with FIG. 2 uses multiplicative notation G^x even though additive notation x*g would be more appropriate in the elliptic curve case. Before reverting back to the multiplication notation used in the embodiment of FIG. 2, it should be noted that in case of an implementation of Elliptic Curves, two especially interesting elliptic curves are Curve25519 and Curve448, as well as the X25519 and X448 functions for performing key agreement using Diffie-Hellman operations with these curves. An ephemeral Diffie-Hellman key exchange using Curve25519 or Curve448 is performed as follows (and is illustrated in the embodiment of FIGS. 3a-3b) with respect to the communication device/peer and the server 3/network device: each of them picks a secret/private key "d" uniformly at random and computes the corresponding public key. "X" is for that explanation used to denote either X25519 or X448, and "G" is used to denote the corresponding base point. From the communication device point of view the public key calculated form the private key is pub_communication device=X(d,G)

The communication device and the server exchange their public keys and compute a shared secret, which by the communication device is computed as:

Shared_Secret=X(d,pub_server).

The correspondence at the server side is:

Public key pub_server=X(d,G)

Shared secret=X(d,pub_communication device)

FIG. 3, i.e. FIGS. 3a and 3b describes the overall process of an embodiment where the Diffie-Hellman group is a ECDHE group. The flowchart of FIG. 3 starts with an EAP-Req/Identity message being sent from the server 3 to the Peer. The Peer returns its identity in an EAP-Resp/Identity message. The Server now has an identity for the peer. The server then asks the help of HSS to run AKA algorithms, generating RAND, AUTN, XRES, CK, IK. Typically, the HSS performs the first part of key derivations so that the authentication server gets the CK' and IK' keys already tied to a particular network name. The interaction between the server and the HSS involves the server sending ID, KDF identification and network name to the HSS, which responds to the server with a message comprising RAND, AUTN, XRES, CK' and IK'. Server now has the needed authentication vector. It generates an ephemeral key pair, sends the public key of that key pair and the first EAP method message to the peer. In the message the AT_PUB_ECDHE attribute carries the public key and the AT_KDF_PFS attribute carries other PFS-related parameters. Both of these are skippable attributes that can be ignored if the peer does not support this extension. The server thus sends, to the Peer, an EAP-Req/AKA'-Challenge which comprises the attributes AT_RAND, AT_AUTN, AT_KDF, AT_KDF_PFS, AT_KDF_INPUT, AT_PUB_ECDHE, and AT_MAC. The peer checks if it wants to do the PFS extension. If yes, the peer will eventually respond with AT_PUB_ECDHE and AT_MAC. If not, it will ignore AT_PUB_ECDHE and AT_KDF_PFS and base all calculations on basic EAP-AKA' attributes, continuing just as in EAP-AKA' per RFC 5448. In any case, the peer needs to query the auth parameters from the USIM card, and thus sends RAND and AUTN to the USIM. The USIM returns CK, IK and RES. The peer now has everything to respond. If it wants to participate in the PFS extension, it will then generate its key pair, calculate a shared key based on its key pair and the server's public key. Finally, it proceeds to derive all EAP-AKA' key values and constructs a full response. The response is sent from the peer to the server as an EAP-Resp/AKA'-Challenge comprising AT-RES, AT_PUB_ECDHE and AT_MAC. The server now has all the necessary values. It generates the ECDHE shared secret and checks the RES and MAC values received in AT_RES and AT_MAC, respectively. Success requires both to be found correct. Note that when this specification is used, the keys generated from EAP-AKA' are based on both CK/IK as well as the ECDHE value. Even if there was an attacker who held the long-term secret keys, only an active attacker could have |determined the generated session keys; in basic EAP-AKA' the keys are only based on CK and IK.

A modified cipher/ciphering key CK' and a modified integrity key IK' are in both embodiments associated with FIG. 2 and FIG. 3a-b respectively, derived from a cipher/ciphering key CK and an integrity key IK and a network identity. The access network identity is in the two embodiments the access network identity as defined in 3GPP specification TS 33.402 V.14.3.0, Annex A.2, as is as such known to the skilled person, but incorporated here in order to make it more readily available to the reader. As is also known to the skilled person, the CK and IK are received by the ME (Mobile Equipment) part of a UE from a UICC of the UE. The last message sent in FIG. 3 is an EAP-Success from the server to the peer.

When deriving CK', IK' from CK, IK and the access network identity, the following parameters shall be used to form the input S to the KDF.

FC=0x20,
P0=value of access network identity, as defined in 3GPP TS 24.302,
L0=length of value of access network identity (variable, depending on access network type),
P1=SQN⊕AK
L1=length of SQN⊕AK (i.e. 0x00 0x06)

If AK is not used, then AK shall be treated in accordance with 3GPP TS 33.102, i.e. as 000 . . . 0.

The access network identity is defined separately for each access network type. For each access network type, the access network identity is documented in TS 24.302 to ensure that UE and HSS use the same access network identities as input for key derivation. The SQN is a sequence number and AK is an anonymity key.

The input key shall be the concatenation CK∥IK of CK and IK.

The KDF returns a 256-bit output, where the 128 most significant bits are identified with CK' and the 128 least significant bits are identified with IK'.

Alternatively, such as in New Radio/5G, the network identity may be the serving network name which is input to the above KDF of TS 33.402 as the value P0 of access network identity. The serving network name is in this alternative case a concatenation of a service code set to '5G' and a Serving Network (SN) Id, e.g. using a character ":".

The term Identity refers to at least a part, but in some embodiments the whole identity string, that is used to identify the peer/communication device and/or the user of the peer/communication device. The user of the peer device may for example be identified by an IMSI stored on the USIM of a UICC. The identity may include a realm portion and a user name portion. The user name may be e.g. a permanent user name, a pseudonym username or a fast re-authentication username. The term peer refers to either a UE/communication device for end users, but it can also be a server end.

NAI: Network Access Identifier according to IETF RFC 4282.

AT_RAND, AT_AUTN, AT_RES, AT_MAC, AT_KDF_INPUT and AT_KDF are for the skilled person previously known attributes as such within EAP-AKA', but are described herein to make them more readily available to the reader.

AT_RAND

The format of the AT_RAND attribute is shown below in FIG. 4.

The value field of the AT_RAND attribute contains two reserved bytes followed by the AKA RAND parameter, 16 bytes (128 bits). The reserved bytes are set to zero when sending and ignored on reception.

AT_AUTN

The format of the AT_AUTN attribute is shown in FIG. 5.

The value field of the AT_AUTN attribute contains two reserved bytes followed by the AKA AUTN parameter, 16 bytes (128 bits). The reserved bytes are set to zero when sending and ignored on reception.

AT_RES

The format of the AT_RES attribute is shown in FIG. 6.

The value field of the AT_RES attribute begins with the 2-byte RES Length, which identifies the exact length of the RES in bits. The RES length is followed by the AKA RES parameter. The length of the AKA RES can vary between 32 and 128 bits. Because the length of the AT_RES attribute must be a multiple of 4 bytes, the sender pads the RES with zero bits where necessary.

AT_MAC

The AT_MAC attribute is used for EAP-AKA message authentication. The value field of the AT_MAC attribute contains two reserved bytes followed by a keyed message authentication code (MAC). The MAC is calculated over the whole EAP packet and concatenated with optional message-specific data, with the exception that the value field of the MAC attribute is set to zero when calculating the MAC. The EAP packet includes the EAP header that begins with the Code field, the EAP-AKA header that begins with the Subtype field, and all the Attributes. The reserved bytes in AT_MAC are set to zero when sending and ignored on reception.

The format of the AT_MAC attribute is shown in FIG. 7.

The MAC algorithm is HMAC-SHA1-128 keyed hash value. (The HMAC-SHA1-128 value is obtained from the 20-byte HMAC-SHA1 value by truncating the output to 16 bytes. Hence, the length of the MAC is 16 bytes.)

When the AT_MAC attribute is included in an EAP-AKA message, the recipient processes the AT_MAC attribute before looking at any other attributes, except when processing EAP-Request/AKA-Challenge.

However, when used within EAP-AKA', the AT_MAC attribute is changed as follows. The MAC algorithm is HMAC-SHA-256-128, a keyed hash value. The HMAC-SHA-256-128 value is obtained from the 32-byte HMAC-SHA-256 value by truncating the output to the first 16 bytes. Hence, the length of the MAC is 16 bytes.

Otherwise, the use of AT_MAC in EAP-AKA' follows Section 10.15 of [RFC4187].

AT_KDF_INPUT

The format of the AT_KDF_INPUT attribute is shown in FIG. 8.

AT_KDF_INPUT field: This is set to 23.

Length field: The length of the attribute, calculated as defined in [RFC4187].

AT_KDF

AT_KDF is an attribute that the server/network device uses to reference a specific key derivation function. It offers a negotiation capability that can be useful for future evolution of the key derivation functions. The format of the AT_KDF attribute is shown in FIG. 9.

The fields in the AT_KDF attribute are as follows:

AT_KDF: This is set to 24.

Length: Set to 1.

Now turning to new attributes according to embodiments associated with FIGS. 2 and 3, e.g. extensions to EAP-AKA'.

AT_GX

The AT_GX carries a Diffie-Hellman value. The format of the AT_GX attribute according to an embodiment is shown in FIG. 10. The fields of the AT_GX attribute are as follows:

AT_GX: This field is set to TBA1 BY IANA.

Length: The length of the attribute, set as other attributes in EAP-AKA [RFC4187].

Value: This value is the server's Diffie-Hellman public value. The length of the Diffie-Hellman public value for e.g. MODP groups may be, and in some embodiments is, equal to the length of the prime modulus over which the exponentiation was performed, prepending zero bits to the value if necessary.

AT_GY

The AT_GY carries a Diffie-Hellman value. The format of the AT_GX attribute according to the same embodiment for AT_GX above is shown in FIG. 11. The fields of AT_GY are as follows:

AT_GY: Set to TBA2 BY IANA.

Length: The length of the attribute, set as other attributes in EAP-AKA [RFC4187].

Value: This value is the peer's/communication device's Diffie-Hellman public value. The length of the Diffie-Hellman public value for MODP groups is equal to the length of the prime modulus over which the exponentiation was performed, prepending zero bits to the value if necessary.

AT_PUB_ECDHE

In an embodiment where the AT_GX and AT_GY values are public keys in the form of an ECDHE (Elliptic Curve Diffie-Hellman Ephemeral) public value, such as in the embodiment illustrated in FIG. 3, then this attribute may alternatively be called AT_PUB_ECDHE. The AT_PUB_ECDHE carries an ECDHE value. The format of the AT_PUB_ECDHE attribute according to an embodiment is shown in FIG. 12.

The fields of the AT_PUB_ECDHE attribute are as follows:

AT_PUB_ECDHE: This is set to TBA1 BY IANA.

Length: The length of the attribute, set as other attributes in EAP-AKA [RFC4187].

Value: The value is then the sender's (i.e. the communication device/peer or the network node/server) ECDHE public value. For Curve25519, the length of this value is 32 bytes, encoded in binary as specified [RFC7748] Section 6.1. To retain the security of the keys, the sender shall in an embodiment of the invention generate a fresh value for each run of the protocol.

AT_KDF_DH

The AT_KDF_DH indicates the used or desired key generation function, if the PFS extension according to the embodiment of FIG. 2 is taken into use. It will also at the same time indicate the used or desired Diffie-Hellman group (which in some embodiments is a an ECDHE group). The AT_KDF_DH attribute is needed to carry this information, as AT_KDF carries the legacy KDF value for those EAP peers that cannot or do not want to use this extension.

The format of the AT_KDF_DH attribute is shown in FIG. 13.

The fields of AT_KDF_DH are as follows:

AT_KDF_DH: This field is set to TBA3 BY IANA.

Length: The length of the attribute is set to 1.

Key Derivation Function: An enumerated value representing the key derivation function that the server (or peer) wishes to use. This field takes on different values as the AT_KDF attribute Key Derivation Function.

A server/servers may, and in some embodiments must, send one or more AT_KDF_DH attributes in the EAP-Request/AKA'-Challenge message. These attributes represent the desired functions ordered by preference, the most preferred function being the first attribute.

AT_KDF_PFS

In an embodiment, e.g. in the case where ECDHE is used, the AT_KDF_DH may be called AT_KDF_PFS as in the embodiment of FIG. 3. In such an embodiment, the most preferred KDF is the only one that the server 3 includes a public key value for, however. So for a set of AT_KDF_PFS attributes, there is always only one AT_PUB_ECDHE attribute.

The format of the AT_KDF_PFS attribute is shown in FIG. 14.

The fields for the AT_KDF_PFS attribute are as follows:

AT_KDF_PFS: This is set to TBA2 BY IANA.

Length: The length of the attribute is set to 1.

Key Derivation Function: An enumerated value representing the key derivation function that the server (or peer) wishes to use. This field has a different name space than the similar field in the AT_KDF attribute Key Derivation Function.

AT_MAC_DH

Some embodiments, such as the one illustrated in FIG. 2 may include an attribute for a separate message authentication code when the PFS is being applied. The AT_MAC_DH attribute is used for EAP-AKA message authentication when the PFS is being applied.

The value field of the AT_MAC_DH attribute contains two reserved bytes followed by a keyed message authentication code. The MAC is in such embodiments calculated over the whole EAP packet and concatenated with optional message-specific data, with the exception that the value field of the AT_MAC and AT_MAC_DH attributes are set to zero when calculating the MAC. This is done in this manner to ensure that AT_MAC_DH can be calculated first, and then AT_MAC calculated as normal (with AT_MAC_DH value already filled in). This enables a receiver unaware of this extension to check the value of AT_MAC without having to understand the procedures in setting various fields to zero when calculating AT_MAC_DH.

In these calculations, the EAP packet includes the EAP header that begins with the Code field, the EAP-AKA' header that begins with the Subtype field, and all the attributes. The reserved bytes in AT_MAC_DH are set to zero when sending and ignored on reception. The contents of the message-specific data that may be included in the MAC calculation are the same as those for AT_MAC (see [RFC4187]).

The format of the AT_MAC_DH attribute is shown in FIG. 15.

The fields of this attributes are:

AT_MAC_DH: This is set to TBA4 BY LANA.

Length: The length of the attribute, MUST be set to 5.

Reserved: This field is set to zero when sent and ignored on receipt.

The MAC algorithm is HMAC-SHA1-128 [RFC2104] keyed hash value. (The HMAC-SHA1-128 value is obtained from the 20-byte HMAC-SHA1 value by truncating the output to 16 bytes. Hence, the length of the MAC is 16 bytes.) The key K_aut_pre is used for in the EAP-Request/AKA'-Challenge message and K_aut in corresponding EAP-Response message.

When the AT_MAC_DH attribute is included in an EAP-AKA' message, the recipient must process the AT_MAC_DH attribute before looking at any other attributes, except when processing EAP-Request/AKA'-Challenge. If the message authentication code is invalid, then the recipient ignores all other attributes in the message and operate as specified in [RFC4187] Section 6.3.

New Key Derivation Function

A new Key Derivation Function type is defined for "EAP-AKA' with DH and 1024-bit MODP", represented by value 1. It represents a particular choice of key derivation function and at the same time selects a Diffie-Hellman group to be used.

The Key Derivation Function type value is only used in the AT_KDF_DH attribute in the embodiment of FIG. 2, and should not be confused with the different range of key derivation functions that can be represented in the AT_KDF attribute as defined in [RFC5448].

The new KDF or another new KDF may in the embodiment of ECDHE in FIG. 3 be a KDF type defined for "EAP-AKA' with ECDHE and Curve25519", represented by value 1. It represents a particular choice of key derivation function and at the same time selects an ECDHE group to be used.

Upon receiving a set of the above attributes, if the peer supports and is willing to use the key derivation function indicated by the first AT_KDF_DH/AT_KDF_PFS attribute, and is willing and able to use the extension according to any one of the embodiments of FIG. 2 or 3, the function is taken into use without any further negotiation. However, if the peer does not support this function or is unwilling to use it, it responds with the EAP-Response/AKA'-Challenge message that contains only one attribute, AT_KDF_DH/ AT_KDF_PFS with the value set to the selected alternative. If there is no suitable alternative, the peer behaves as if AUTN had been incorrect and authentication fails (see FIG. 3 of [RFC4187] for more info). The peer fails the authentication also if there are any duplicate values within the list of AT_KDF_DH/AT_KDF_PFS attributes (except where the duplication is due to a request to change the key derivation function; see below for further information). If the peer does not recognise the extension defined in this specification or is unwilling to use it, it ignores the AT_KDF_DH/ AT_KDF_PFS attribute.

Upon receiving an EAP-Response/AKA'-Challenge with AT_KDF_DH/AT_KDF_PFS from the peer, the server checks that the suggested AT_KDF_DH/AT_KDF_PFS value was one of the alternatives in its offer. The first AT_KDF_DH/AT_KDF_PFS value in the message from the server is not a valid alternative. If the peer has replied with the first AT_KDF_DH/AT_KDF_PFS value, the server behaves as if AT_MAC_DH (if used, otherwise AT_MAC) of the response had been incorrect and fails the authentication. For an overview of the failed authentication process in the server side, see FIG. 2 in [RFC4187]. Otherwise, the server re-sends the EAP-Response/AKA'-Challenge message, but adds the selected alternative to the beginning of the list of AT_KDF_DH/AT_KDF_PFS attributes, and retains the entire list following it. Note that this means that the selected alternative appears twice in the set of AT_KDF values. Responding to the communication device's/peer's request to change the key derivation function is the only legal situation where such duplication may occur.

When the peer receives the new EAP-Request/AKA'- Challenge message, it may, and in some embodiments must, check that the requested change, and only the requested change occurred in the list of AT_KDF_DH/AT_KDF_PFS attributes. If yes, it continues. If not, it behaves as if AT_MAC/AT_MAC_DH had been incorrect and fails the authentication. If the peer receives multiple EAP-Request/ AKA'-Challenge messages with differing AT_KDF_DH/ AT_KDF_PFS attributes without having requested negotiation, the peer may, and in some embodiments behaves as if AT_MAC/AT_MAC_DH had been incorrect and fail the authentication.

When AT_KDF_DH is set to 1 by IANA, the Master Key (MK) is derived and as follows:

MK=PRF'(IK'|CK'|$G'xy$,"EAP-AKA'"|Identity)

$K\_encr$=MK[0 . . . 127]

$K\_aut$=MK[128 . . . 383]

$K\_re$=MK[384 . . . 639]

MSK=MK[640 . . . 1151]

EMSK=MK[1152 . . . 1663]

and the rest of computation proceeds as defined in Section 3.3 of [RFC5448]. The above values are sufficient for all messages and all behaviour in the protocol, starting from (and included) the EAP-Response/AKA'-Challenge message that the peer sends to the server to successfully complete authentication.

K_encr (encryption key) is thus 128 bits, K_aut (authentication key) is 256 bits, and K-re (re-authentication key) is 256 bits.

The Pseudo-Random Function PRF' construction is the same as the IKEv2 uses and is referred to in section 3.4.1 of [RFC5448]. The value "EAP-AKA'" is typically an eight-character-long ASCII (American Standard Code for Information Interchange) string. It is used as is, without any trailing NUL characters. The PRF' takes two arguments. K is a 256-bit value and S is an octet string of arbitrary length. The alternative PRF' is defined as follows:

PRF'(K,S)=T1|T2|T3|T4| . . . .

where:
T1=HMAC-SHA-256 (K, S|0x01)
T2=HMAC-SHA-256 (K, T1|S|0x02)
T3=HMAC-SHA-256 (K, T2|S|0x03)
T4=HMAC-SHA-256 (K, T3|S|0x04) . . . .

The PRF' produces as many bits of output as is needed. HMAC-SHA-256 is the application of HMAC [RFC2104] to SHA-256.

The MSK (Master Session Key) is keying material that is derived between the EAP peer and server and exported by the EAP method. The MSK is at least 64 octets in Length and in the embodiments disclosed here 512 bits. In existing implementations, a AAA server acting as an EAP server transports the MSK to the authenticator.

The EMSK (Extended Master Session Key) is additional keying material derived between the EAP client/communication device/peer and server that is exported by the EAP method. The EMSK is at least 64 octets in length and in EAP-AKA' 512 bits. The EMSK is not shared with the authenticator or any other third party. The value "EAP-AKA'" may in another embodiment, especially for use when generating a session key such as EMSK, be a twelve-characters-long ASCII string. An alternative name for the twelve-characters-long ASCII string version, especially for directly or indirectly generating EMSK with the help of a Diffie-Hellman value, is "EAP-AKA' PFS" to distinguish it from an eight-character value for use in EAP-AKA' key derivation without the use of PFS parameters sent between the communication device and the network node/server. This twelve-character ASCII string for EAP-AKA' PFS can thus be used as input for example when "EAP-AKA' with DH and 1024-bit MODP" is used/selected and for an "EAP-AKA' with ECDHE and Curve25519" selection (see below).

K_aut that is used in AT_MAC is still exactly as it was in EAP-AKA'. The only change to key derivation is in re-authentication keys and keys exported out of the EAP method, MSK and EMSK. As a result, EAP-AKA' attributes such as AT_MAC continue to be usable even when this extension is in use and with or without the use of AT_MAC_DH.

K_aut_pre and K_encr_pre are to be used before the first successful EAP-Response/AKA'-Challenge message. This includes the EAP-Request/AKA'-Challenge message sent by the server, where the AT_MAC_DH value will use K_aut_pre. However, since now MK depends on G^xy that is only available once both sides have both G^x and G^y, messages and behaviour before the successful EAP-Response/AKA'-Challenge message need to use values that do not depend on G^xy:

MK_pre=PRF'(IK'|CK',"EAP-AKA'"|Identity)

K_encr_pre=MK[0 . . . 127]

K_aut_pre=MK[128 . . . 383]

Introducing PFS for EAP-AKA' can as mentioned above in an alternative embodiment be achieved by using an Elliptic Curve Diffie-Hellman (ECDH) exchange [RFC7748]. In EAP-AKA' PFS this exchange is run in an ephemeral manner, i.e., using temporary keys as specified in [RFC8031] Section 2.

In the embodiment illustrated in FIGS. 3a and 3b and when the Key Derivation Function field in the AT_KDF_PFS attribute is set to 1 and the Key Derivation Function field in the AT_KDF attribute is also set to 1, the MK as follows:

MK=PRF'(IK'|CK',"EAP-AKA'"|Identity)

MK_ECDHE=PRF'(IK'|CK'|SHARED_SECRET, "EAP-AKA'PFS"|Identity)

K_encr=MK[0 . . . 127]

K_aut=MK[128 . . . 383]

K_re=MK_ECDHE[0 . . . 255]

MSK=MK_ECDHE[256 . . . 767]

EMSK=MK_ECDHE[768 . . . 1279]

Where SHARED_SECRET (corresponding to the third PFS parameter of the claims of this specification) is the shared secret computed via ECDHE, as specified in Section 2 of [RFC8031] and Section 6.1 of [RFC7748]. Both the peer and the server may check for zero-value shared secret as specified in Section 6.1 of [RFC7748]. If such checking is performed and the SHARED_SECRET has a zero value, both parties behaves as if the current EAP-AKA' authentication process starts again from the beginning. Note that the way that shared secret is tested for zero can, if performed inappropriately, provide an ability for attackers to listen to CPU power usage side channels. Refer to [RFC7748] for a description of how to perform this check in a way that it does not become a problem.

Diffie-Hellman Groups

The selection of suitable groups for the Diffie-Hellman computation is necessary. The choice of a group is made at the same time as deciding to use of particular key derivation function in AT_KDF_DH. For "EAP-AKA' with DH and 1024-bit MODP" the Diffie-Hellman group is the 1024-bit MODP group specified in Appendix B.2 of [RFC7296] as follows:

Group 2—1024-bit MODP

This group is assigned ID 2 (two).

The prime is 2^1024−2^960−1+2^64*{[2^894 pi]+ 129093}.

Its hexadecimal value is:

```
FFFFFFFF FFFFFFFF C90FDAA2 2168C234 C4C6628B 80DC1CD1
29024E08 8A67CC74 020BBEA6 3B139B22 514A0879 8E3404DD
EF9519B3 CD3A431B 302B0A6D F25F1437 4FE1356D 6D51C245
E485B576 625E7EC6 F44C42E9 A637ED6B 0BFF5CB6 F406B7ED
EE386BFB 5A899FA5 AE9F2411 7C4B1FE6 49286651 ECE65381
FFFFFFFF FFFFFFFF
```

The generator is 2.

In an embodiment where ECDHE is used for the enhancement of EAP-AKA', selection of suitable groups for the elliptic curve computation is necessary. The choice of a group is made at substantially the same time as when deciding to use a particular key derivation function in AT_KDF_PFS. For "EAP-AKA' with ECDHE and Curve25519" the group is the Curve25519 group specified in [RFC8031].

Message Processing

Changes related to message processing when the extension according to the above embodiments is used in EAP-AKA' are now described. It is specified when a message may be transmitted or accepted, which attributes are allowed in a message, which attributes are required in a message, and other message-specific details, where those details are different for this extension than the base EAP-AKA' or EAP-AKA protocol. Unless otherwise specified here, the rules from [RFC5448] or [RFC4187] apply.

EAP-Request/AKA'-Identity

In at least some of the embodiments, no changes, except that the AT_KDF_DH, AT_GX, AT_GY, and AT_MAC_DH attributes shall not be added to this message. The same with the AT_KDF_PFS or AT_PUB_ECDHE in case of ECDHE. The appearance of these messages in a received message MUST be ignored. In an embodiment where ECDHE is used, no changes except that the AT_KDF_PFS or AT_PUB_ECDHE attributes must not be added to this message.

EAP-Response/AKA'-Identity

In at least some of the embodiments, no changes, except that the AT_KDF_DH, AT_GX, AT_GY, and AT_MAC_DH attributes shall not be added to this message. The same with the AT_KDF_PFS or AT_PUB_ECDHE in case of ECDHE. The appearance of these messages in a received message must be ignored.

EAP-Request/AKA'-Challenge

The server sends the EAP-Request/AKA'-Challenge on full authentication as specified by [RFC4187] and [RFC5448]. The attributes AT_RAND and AT_MAC are included as specified in in Section 9.3 of [RFC4187], and are also necessary for backwards compatibility.

In EAP-Request/AKA'-Challenge, there is no message-specific data covered by the MAC for the AT_MAC attribute. The AT_KDF_PFS and AT_PUB_ECDHE attributes MUST be included. The AT_PUB_ECDHE attribute carries the server's public Diffie-Hellman key. If either AT_KDF_PFS or AT_PUB_ECDHE is missing on reception, the peer MUST treat them as if neither one was sent, and the assume that the extension defined in this specification is not in use.

The AT_RESULT_IND, AT_CHECKCODE, AT_IV, AT_ENCR_DATA, AT_PADDING, AT_NEXT_PSEUDONYM, AT_NEXT_REAUTH_ID and other attributes may be include as specified in Section 9.3 of [RFC4187].

AT_MAC_DH should be included in at least some embodiments of the one in FIG. 2. In EAP-Request/AKA'-Challenge, there is no message-specific data covered by the MAC either for AT_MAC or AT_MAC_DH attributes.

When the AT_MAC_DH attribute is included, the AT_KDF_DH and AT_GX attributes must be included as well.

When processing the EAP-Request/AKA'-Challenge, the peer must process AT_RAND, AT_AUTN, AT_KDF_DH/ AT_KDF_PFS, AT_GX/AT_PUB_ECDHE before processing other attributes. Only if these attributes are verified to be valid, the peer derives keys and verifies AT_MAC_DH (if used). If the peer is unable or unwilling to perform the extension specified in this document, it proceeds as defined in [RFC5448]. Finally, the operation in case an error occurs is specified in Section 6.3.1. of [RFC4187].

EAP-Response/AKA'-Challenge

The peer/communication device sends EAP-Response/AKA'-Challenge in response to a valid EAP-Request/AKA'-Challenge message, as specified by [RFC4187] and [RFC5448]. If the peer supports and is willing to perform the extension according to any one of the embodiments in FIGS. 2 and 3, and the server had made a valid request involving the attributes mentioned in conjunction with the EAP-Request/AKA'-Challenge message above (with or without the AT_MAC_DH), the peer responds per the rules specified below. Otherwise, the peer responds as specified in [RFC4187] and [RFC5448] and ignores the attributes related to this extension. If the peer has not received attributes related to this extension from the Server, and has a policy that requires it to always use this extension, it behaves as if AUTN had been incorrect and fails the authentication.

The AT_MAC_DH attribute is in an embodiment included. In EAP-Response/AKA'-Challenge, there is no message-specific data covered by the MAC. The AT_GY/AT_PUB_ECDHE attribute is also be included and carries the peer's public Diffie-Hellman key.

The AT_RES attribute is in an embodiment included and checked as specified in IETF RFC4187. When processing this message, the Server processes AT_RES before processing other attributes. Only if this attribute is verified to be valid, the Server derives keys and verifies AT_MAC.

If the Server has proposed the use of the extension specified in this protocol, but the peer ignores and continues the basic EAP-AKA' authentication, the Server makes policy decision of whether this is allowed. If this is allowed, it continues the EAP-AKA' authentication to completion. If it is not allowed, the Server behaves as if authentication failed.

The AT_CHECKCODE, AT_RESULT_IND, AT_IV, AT_ENCR_DATA and other attributes may be included as specified in Section 9.4 of [RFC4187].

EAP-Request/AKA'-Reauthentication

No changes, but note that the re-authentication process uses the keys generated in the original EAP-AKA' authentication, which, if the extension of the embodiments illustrated in FIGS. 2 and 3 is in use, employs key material from the Diffie-Hellman procedure.

EAP-Response/AKA'-Reauthentication

No changes, but as discussed in conjunction with the EAP-Request/AKA'-Reauthentication above, re-authentication is based on the key material generated by EAP-AKA' and the extension of the embodiments illustrated in FIGS. 2 and 3.

EAP-Response/AKA'-Synchronization-Failure

No changes, except that the AT_KDF_DH, AT_GX, AT_GY (or AT_KDF_DH or AT_PUB_ECDHE), and AT_MAC_DH attributes is in the embodiments of FIGS. 2 and 3 not to be added to this message. The appearance of these messages in a received message is in those embodiments ignored.

EAP-Response/AKA'-Authentication-Reject

In the embodiments illustrated in FIGS. 2 and 3, no changes, except that the AT_KDF_DH, AT_GX, AT_GY (or AT_KDF_DH or AT_PUB_ECDHE), and AT_MAC_DH attributes are not added to this message. The appearance of these messages in a received message must be ignored.

EAP-Response/AKA'-Client-Error

In the embodiments illustrated in FIGS. 2 and 3, no changes, except that the AT_KDF_DH, AT_GX, AT_GY (or AT_KDF_DH or AT_PUB_ECDHE), and AT_MAC_DH attributes are not added to this message. The appearance of these messages in a received message must be ignored.

EAP-Request/AKA'-Notification

No changes.

EAP-Response/AKA'-Notification

No changes.

Security Considerations

This section deals only with the changes to security considerations as they differ from EAP-AKA', or as new information has been gathered since the publication of [RFC5448].

The possibility of attacks against key storage offered in SIM or other smart cards has been a known threat. But as the discussion above shows, the likelihood of practically feasible attacks has increased. Many of these attacks can be best dealt with improved processes, e.g., limiting the access to the key material within the factory or personnel, etc. But not all attacks can be entirely ruled out for well-resourced adversaries, irrespective of what the technical algorithms and protection measures are.

This extension according to the embodiments illustrated in FIGS. 2 and 3a-3b can provide assistance in situations where there is a danger of attacks against the key material on SIM cards by adversaries that cannot or who are unwilling to mount active attacks against large number of sessions. This extension is most useful when used in a context where EAP keys are used without further mixing that can provide PFS. For instance, when used with IKEv2 [RFC7296], the session keys produced by IKEv2 have this property, so better characteristics of EAP keys is not that useful. However, typical link layer usage of EAP does not involve running Diffie-Hellman, so using EAP to authenticate access to a network is one situation where the extension defined in this document can be helpful.

This extension generates keying material using the ECDHE exchange in order to gain the PFS property. This means that once an EAP-AKA' authentication run ends, the session that it was used to protect is closed, and the corresponding keys are forgotten, even someone who has recorded all of the data from the authentication run and session and gets access to all of the AKA long-term keys cannot reconstruct the keys used to protect the session or any previous session, without doing a brute force search of the session key space. Even if a compromise of the long-term keys has occurred, PFS is still provided for all future sessions, as long as the attacker does not become an active attacker. Of course, as with other protocols, if the attacker has learned the keys and does become an active attacker, there is no protection that that can be provided for future sessions. Among other things, such an active attacker can impersonate any legitimate endpoint in EAP-AKA', become a MITM in EAP-AKA' or the extension defined in this document, retrieve all keys, or turn off PFS. Still, past sessions where PFS was in use remain protected. Achieving PFS requires that when a connection is closed, each endpoint MUST forget not only the ephemeral keys used by the connection but also any information that could be used to recompute those keys.

The following security properties of EAP-AKA' may be impacted by embodiments of this extension:

Protected Ciphersuite Negotiation

EAP-AKA' has a negotiation mechanism for selecting the key derivation functions, and this mechanism has been extended by the extension. The resulting mechanism continues to be secure against bidding down attacks.

There are two specific needs in the negotiation mechanism:

Negotiating Key Derivation Function within the Extension

The negotiation mechanism allows changing the offered key derivation function, but the change is visible in the final EAP-Request/AKA'-Challenge message that the server sends to the peer. This message is authenticated via the AT_MAC_DH attribute (when used) or the AT_MAC, and carries both the chosen alternative and the initially offered list. The peer refuses to accept a change it did not initiate. As a result, both parties are aware that a change is being made and what the original offer was.

Negotiating the Use of this Extension

This extension is offered by the server through presenting the AT_KDF_DH/AT_KDF_PFS, AT_GX/AT_PUB_ECDHE, and AT_MAC_DH attributes in the EAP Request/AKA'-Challenge message. These attributes are protected by AT_MAC or both AT_MAC and AT_MAC_DH when AT_MAC_DH is used, so attempts to change or omit them by an adversary will be detected. Except of course, if the adversary holds the long-term shared secret and is willing to engage in an active attack.

Such an attack can, for instance, forge the negotiation process so that no PFS will be provided. However, as noted above, an attacker with these capabilities will in any case be able to impersonate any party in the protocol and perform MITM attacks. That is not a situation that can be improved by a technical solution. However, as discussed above, even an attacker with access to the long-term keys is required to be a MITM on each AKA run, which makes mass surveillance more laborious.

The security properties of the extension also depend on a policy choice. Both the peer and the server make a policy decision of what to do when it was willing to perform the extension specified in this protocol, but the other side does not wish to use the extension. Allowing this has the benefit of allowing backwards compatibility to equipment that did not yet support the extension. When the extension is not supported or negotiated by the parties, no PFS can obviously provided.

If turning off the extension specified in this protocol is not allowed by policy, the use of legacy equipment that does not support this protocol is no longer possible. This may be appropriate when, for instance, support for the extension is sufficiently widespread, or required in a particular version of a mobile network.

Key Derivation

This extension provides key material that is based on the Diffie-Hellman keys, yet bound to the authentication through the (U)SIM card. This means that subsequent payload communications between the parties are protected with keys that are not solely based on information in the clear (such as the RAND) and information derivable from the long-term shared secrets on the (U)SIM card. As a result, if anyone successfully recovers shared secret information, they are unable to decrypt communications protected by the keys generated through this extension. Note that the recovery of shared secret information could occur either before or after the time that the protected communications are used. When this extension is used, communications at time t0 can be protected if at some later time t1 an adversary learns of long-term shared secret and has access to a recording of the encrypted communications.

Obviously, this extension is still vulnerable to attacker that are willing to perform an active attack and who at the time of the attack have access to the long-term shared secret.

This extension does not change the properties of related to re-authentication. No new Diffie-Hellman run is performed during the re-authentication allowed by EAP-AKA'. However, if this extension was in use when the original EAP-AKA' authentication was performed, the keys used for re-authentication (K_re) are based on the Diffie-Hellman keys, and hence continue to be equally safe against expose of the long-term secrets as the original authentication.

In addition, it is worthwhile to discuss Denial-of-Service attacks and their impact on this protocol. The calculations involved in public key cryptography require computing power, which could be used in an attack to overpower either the peer or the server. While some forms of Denial-of-Service attacks are always possible, the following factors help mitigate the concerns relating to public key cryptography and EAP-AKA' PFS.

In 5G context, other parts of the connection setup involve public key cryptography, so while performing additional operations in EAP-AKA' is an additional concern, it does not change the overall situation. As a result, the relevant system components need to be dimensioned appropriately, and detection and management mechanisms to reduce the effect of attacks need to be in place.

This specification is constructed so that a separation between the USIM and Peer on client side and the Server and HSS on network side is possible. This ensures that the most sensitive (or legacy) system components cannot be the target of the attack. For instance, EAP-AKA' and public key cryptography takes place in the phone and not the low-power SIM card.

EAP-AKA' has been designed so that the first actual message in the authentication process comes from the Server, and that this message will not be sent unless the user has been identified as an active subscriber of the operator in question. While the initial identity can be spoofed before authentication has succeeded, this reduces the efficiency of an attack.

This text specifies an order in which computations and checks must occur. When processing the EAP-Request/AKA'-Challenge message, for instance, the AKA authentication must be checked and succeed before the peer proceeds to calculating or processing the PFS related parameters. The same is true of EAP-Response/AKA'-Challenge. This ensures that the parties need to show possession of the long-term secret in some way, and only then will the PFS calculations become active. This limits the Denial-of-Service to specific, identified subscribers. While botnets and other forms of malicious parties could take advantage of actual subscribers and their key material, at least such attacks are (a) limited in terms of subscribers they control, and (b) identifiable for the purposes of blocking the affected subscribers.

It should be emphasized that the term "comprises/comprising" when used in this specification is taken to specify the presence of stated features, integers, steps or components, but does not preclude the presence or addition of one or more other features, integers, steps, components or groups thereof. The words 'parameter' and "attribute" should be interpreted as covering values of the parameter and attribute respectively, e.g. that the calculation of a parameter comprises the calculation of a value for that parameter, and that a calculation or derivation of a result or response based on one or more parameters comprises a calculation of the result or the response based on one or more values of the one or more parameters. In the same manner, receiving a parameter and/or attribute and sending/forwarding a parameter and/or attribute comprise the receiving and sending of a value of that parameter. The same goes for generation of a parameter or attribute, which means that a parameter value or an attribute value is generated. The same is also true for the identity of e.g. the communication device/peer, i.e. the identity and the identity value is used interchangeably without any problems for the skilled person to understand the realisation of the embodiments herein.

It should be realized that the communication device is not limited to being a User Equipment (UE). It may be any type of wireless endpoint, mobile station, mobile phone, wireless local loop phone, smartphone, desktop computer, PDA, cell phone, tablet, laptop, VoIP phone or handset, which is able to wirelessly send and receive data and/or signals to and from a network node. It may also be a communication device providing e.g. 3G, 4G and/or 5G connectivity for e.g. a sensor. The communication device may be a digital camera, a vehicle (or embedded telematics unit or Electronic Control Unit therein), a home gateway, home/residential WiFi/4G access point, an electricity meter, a domestic appliance device like a refrigerator, thermostat, burglary alarm, vacuum cleaner, lawn mower robot or the like. It may also be a stationary terminal connected to a fixed communication network.

In the following description, for purposes of explanation and not limitation, specific details are set forth such as particular architectures, interfaces, techniques, etc. in order to provide a thorough understanding of the embodiments. However, it will be apparent to those skilled in the art that features of the embodiments may be practiced in other embodiments that depart from these specific details. In other instances, detailed descriptions of well-known devices, circuits, and methods are omitted so as not to obscure the description of novel features with unnecessary detail.

The disclosure concerns improved communication security in a communication network using pre-shared keys as basis for the communication security. A communication network may here be a mobile communication network, such as a second Generation (2G) mobile communication network like Global System for Mobile communication (GSM), a third generation (3G) network like Universal Mobile Telecommunications System (UMTS) or a fourth generation (4G) network such as Long-Term Evolution (LTE) or any future, evolved system like the 3GPP 5th Generation (5G) currently being developed and including the EAP-AKA' protocol for session key generation. These are just a few examples of networks where the embodiments may be implemented. Other types of networks that may be used are for instance Wireless Local Area Networks (WLAN). A communication device, such as a user equipment (UE), a Mobile Station (MS), sometimes denoted a cellular phone, may communicate using these communication networks. Furthermore, a communication device here is connected to an identity module, where the identity module may be a smart card such as a universal integrated circuit card (UICC) holding a subscriber identity module (SIM) and/or a Universal Subscriber Identity Module (USIM) or an IP Multimedia Subsystem SIM (ISIM), an embedded SIM (eSIM) module, a software module, an integrated UICC (iUICC), a Global Platform Trusted Execution module or the like. The identity module may thus also be implemented in software running in a trusted execution environment, or software running on a general purpose processor, although the latter is not preferred. Generally the term USIM is used as an example in the descriptions, but the person skilled in the art will appreciate that any type of identity module associated with the peer/communication device will serve the same purpose. It should be realized that the identity module may be a part of the communication device, e.g. in the form of an eUICC/eSIM and an iUICC. It may also be a separate or removable entity (such as a standard nano SIM card) that is connected to the communication device, when the communication device is to be used.

As a basis for communication security a key is used, e.g. for authentication and key agreement. The key may advantageously be pre-shared and stored in an identity module as just described. In the following only the example of the communication device/peer in the form of a UE will be discussed. However, it should be realized that the communication device is not limited to being a UE.

The AUTN (Authentication Token) is a parameter composed of different fields: AMF (Authentication Management Field), MAC and a sequence number indication (SQN, possibly encrypted/modified by an anonymity key AK). The MAC is a Message Authentication Code that protects the challenge RAND (RANDom number), as well as SQN and AMF from being forged by a 3rd party through the cryptographic functions implemented by the USIM. The keys CK and IK are used directly for ciphering/integrity protection in 3G and are used indirectly for these purposes in 4G/LTE and 5G/New Radio by deriving ciphering/integrity keys from CK and IK (specifically: from a key Kasme, formed by CK and IK and for forming CK' and IK' used in EAP-AKA' as previously discussed).

As a simplifying notational convention used in the remainder of the description of cryptographic and other forms of computations, parameters other than those explicitly mentioned may be input to functions such as Key Derivation Functions (KDF), Message Authentication Codes (MAC) and all other functions in all instances described herein. The parameters may be put in a different order than explicitly mentioned. The parameters may be transformed before being input to the function. For example, a set of parameters $P1, P2, \ldots, Pn$, for some non negative integer n, could be transformed by first being run through a second function f and the result of that, i.e., $f(P1, P2, \ldots, Pn)$, being input to the function.

An example of a key derivation when a parameter P1 is first transformed before being input to a KDF to calculate a key called "output_key" could be a derivation of form output_key=KDF(f(P1), some other parameter), where f is some arbitrary function or chain of functions. The input "some other parameter" could be 0, 1 or more other parameters, e.g., used to bind the key to a certain context. Sometimes, the notation " . . . " may be used as a synonym for "some other parameter". Parameters may be input as separate parameters or may be concatenated together and then input in one single input to the KDF. Thus, one of skill in the art will understand that additional parameters may be used, parameters may be transformed or re-arranged etc. and even in the presence of variations like these, the core of the idea remains the same.

Figure 16:
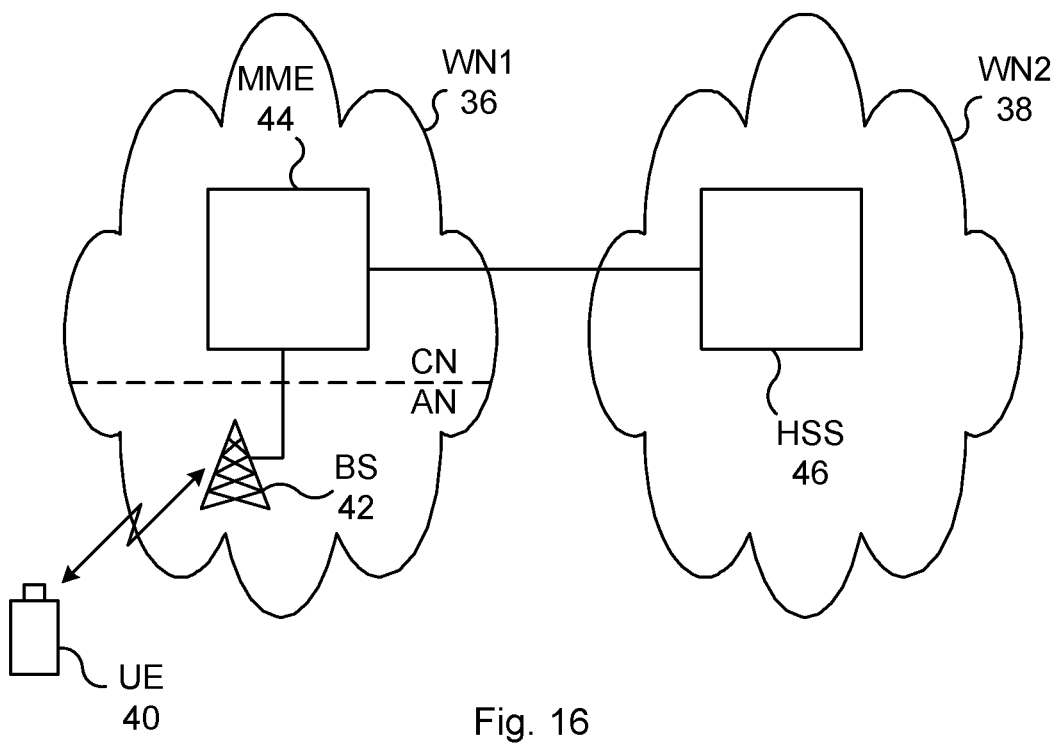

FIG. 16 schematically shows one exemplifying communication environment of a communication device 40, which communication device 40 in FIG. 3 is in the form of a UE for which the communication security is being enhanced. In this example there is a first and second communication network, which in this case are both mobile communication networks, such as LTE networks. A UE is in this case in wireless contact over an air interface with a base station BS 42 of a first communication network 36, which communication network is a first wireless network WN1. The base station 42 is in turn connected to a first network device 44 of the first wireless network WN1, which first network device 44 may also be a network node. In this example it is an MME (Mobility Management Entity). The MME 44 is in turn connected to a second network device 46 in a second communication network 38, which second communication network 46 is a second wireless network WN2. The second network device 46 is in this case an HSS and may be considered to be a network node. The first wireless network WN1 may be a visited network, i.e. a network that the UE visits, while the second wireless network WN2 may be a home network of the UE, i.e. a network hosting a subscription associated with the UE. The base station 42, which in many networks may be denoted nodeB or eNodeB is provided in a part of the first wireless network WN named an access network AN, while the MME 44 is provided in a part called a core network CN.

The first communication network 36 is thus in this example a network that is visited by the UE, while the second communication network 38 is a home network of the UE.

In different embodiments, each wireless network may comprise any number of wired or wireless networks, network nodes, base stations, controllers, wireless devices, relay stations, and/or any other components that may facilitate or participate in the communication of data and/or signals whether via wired or wireless connections.

Each wireless network may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

As was mentioned earlier embodiments are directed towards introducing PFS in a system such as that in the embodiments illustrated in FIGS. 2 and 3.

FIG. 17 shows one exemplifying realization of the UE. The UE may comprise a UICC 2 with a universal subscriber identity module/application (USIM) 48 connected to a perfect forward security EAP Authentication and Key Agreement module 52 for EAP-AKA' (hereinafter called EAP-AKA' module), which in turn is connected to a communication module 50, which may be a wireless communication module. Here the communication module 50 and EAP-AKA' module 52 together are a part of a mobile equipment 51, while the USIM is an identity module 48. Thus, together, the UICC with its USIM, EAP-AKA' module, and communication module form at least a part of the user equipment 40.

Figure 18:
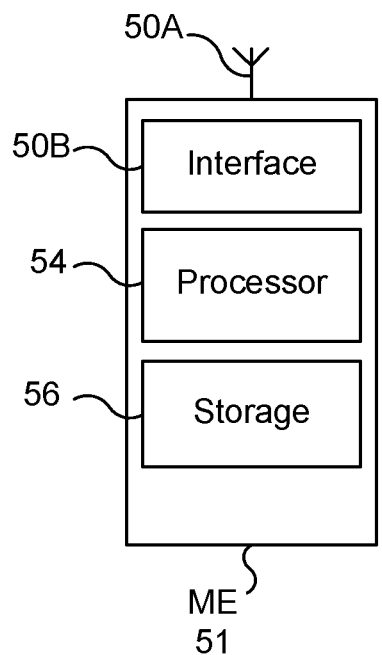
FIG. 18 shows a block schematic of an embodiment of a mobile equipment.
Figure 19:
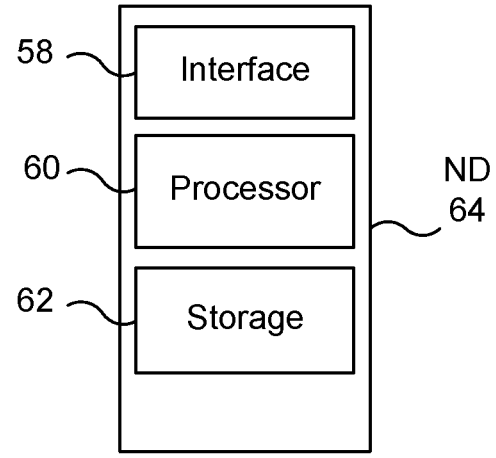
FIG. 19 shows a block schematic of an embodiment of a network device/server.

One way of realizing the ME 51 is schematically shown in FIG. 18. ME 51 comprises processor 54, storage 56, interface 50B and antenna 50A. These components may work together in order to provide ME functionality, such as providing wireless connections in a wireless network. The components of ME 51 are depicted as single boxes located within a single larger box, however in practice an ME may comprise multiple different physical components that make up a single illustrated component (e.g., storage 56 may comprise multiple discrete microchips, each microchip representing a portion of the total storage capacity).

Processor 54 may be a combination of one or more of a microprocessor, controller, microcontroller, central processing unit, digital signal processor, application specific integrated circuit, field programmable gate array, or any other suitable computing device, resource, or combination of hardware, software and/or encoded logic operative to provide, either alone or in combination with other ME components, such as storage 56, ME functionality. Such functionality may include providing various wireless features discussed herein, including any of the features or benefits disclosed herein. In one embodiment the USIM is stored in a iUICC, which in turn is tamper resistant part of the processor 54.

Storage 56 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 56 may store any suitable data, instructions, or information, including software and encoded logic, utilized by ME 51. Storage 56 may be used to store any calculations made by processor 54 and/or any data received via interface 50B.

Interface 50B may be used in the wireless communication of signalling and/or data between UE and a network device, such as the base station 42. For example, interface 50B may perform any formatting, coding, or translating that may be needed to allow UE to send and receive data from base station 42 over a wireless connection. Interface 50B may also include a radio transmitter and/or receiver that may be coupled to or a part of antenna 50a. The radio may receive digital data that is to be sent out to base station 42 via a wireless connection. The radio may convert the digital data into a radio signal having the appropriate channel and bandwidth parameters. The radio signal may then be transmitted via antenna 50a to base station 42.

Antenna 50a may be any type of antenna capable of transmitting and receiving data and/or signals wirelessly.

The storage 56 may also comprise instructions for handling PFS in relation to communication of the ME to the first wireless network. The storage 56 may more particularly comprise computer instructions causing the processor 54 to implement the EAP-AKA' module 52. The storage 56 may also comprise UICC drivers for communication allowing the ME to detect and power the UICC for the calculation of e.g. the CK and IK and output these to the EAP-AKA' module of the ME. The communication module 50 may in turn in essence be implemented through the combination of the interface 50B and antenna 50A.

FIG. 6 shows a general network device/server 64, the structure of which is applicable for both the first and the second network device 44 and 46. The network device 64 comprises processor 60, storage 62 and interface 58. These components are depicted as single boxes located within a single larger box. In practice however, a network device may comprise multiple different physical components that make up a single illustrated component (e.g., interface 58 may comprise terminals for coupling wires for a wired connection). Similarly, network device 64 may be composed of multiple physically separate components, which may each have their own respective processor, storage, and interface components. In certain scenarios in which network device 64 comprises multiple separate components, one or more of the separate components may be shared among several network devices.

Processor 60 may be a combination of one or more of a microprocessor, controller, microcontroller, central processing unit, digital signal processor, application specific integrated circuit, field programmable gate array, or any other suitable computing device, resource, or combination of hardware, software and/or encoded logic operative to provide, either alone or in conjunction with other network device components, such as storage 62, network device functionality. For example, processor 60 may execute instructions stored in storage 62.

Storage 62 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 62 may store any suitable instructions, data or information, including software and encoded logic, utilized by network device 64. Storage 62 may be used to store any calculations made by processor 60 and/or any data received via interface 58.

Network device 64 also comprises interface 58 which may be used in the wired communication of signalling and/or data between network device 64, network WN1 or WN2, and/or UE. For example, interface 58 may perform any formatting, coding, or translating that may be needed to allow network device 64 to send and receive data from network WN1 or WN2 over a wired connection.

The embodiments described herein are concerned with adding PFS to EAP-AKA'. An aim is therefore, at least according to some embodiments, to raise the security level of communication between a communication device and a communication network in relation to the use of long-term shared keys. It may also be of interest to avoid sending additional EAP-AKA' messages, which is achieved by the embodiments disclosed in conjunction with FIGS. 2 and 3. It is thus desirable that the existing message structure is used without adding new messages. This may be important from an energy saving perspective both regarding the communication device as well as on a general environmental level, since the sending of additional messages uses energy, which may be a limited resource especially in the communication device. Furthermore, network communication is also typically standardized and it is often much harder to agree on the introduction on new messages, than the adding of new elements in already existing messages which would be necessary to provide authentication and MITM protection if using a straight-forward approach to adding PFS.

In the examples given here the communication network 36 is the first wireless network WN1 and the first network device 44 is the MME of the first wireless network.

The operation may start with the UE attaching to the first communication network 36. As a part of this, an identifier e.g. international mobile subscriber identity IMSI may be provided from the UE as at least a part of the NAI or rather from the USIM 48 of the UE to the first network device 44, which in turn sends a request for an authentication vector AV to the second network device 46 in the second communication network 38. The second network device 46 generates the authentication vector, which may comprise the authentication token AUTN, the random value RAND, the expected result of the verification computation XRES. It may also comprise other keys such as the keys CK/IK or even the modified ciphering key and integrity key CK'/IK'.

Thus, in so far, the second network node 46 may operate according to existing EAP-AKA' specifications. In this way the first network device 44 obtains the authentication vector, which may at least comprise a random value RAND and an expected verification result XRES. Here it can be mentioned that RAND is provided for use as a challenge to the UE and AUTN comprises a challenge verification code for this challenge.

As indicated earlier, the USIM 48 comprises a key K, with advantage a key K that is pre-shared with the second network device 46. It also comprises cryptographic processing means. This module 48 may then provide at least one result parameter (CK/IK) as a response to the challenge (RAND and AUTN). One result parameter may be one or more cryptographic keys such as the ciphering key CK and the integrity key IK, which may be used by the EAP-AKA' module 52 to obtain, such as receiving or deriving CK'/IK'. Another result parameter may be a response parameter RES to the challenge, which response parameter has a response value. Such a response parameter thus has a cryptographic value computed based on the pre-shared key and said cryptographic processing means.

Figure 20:
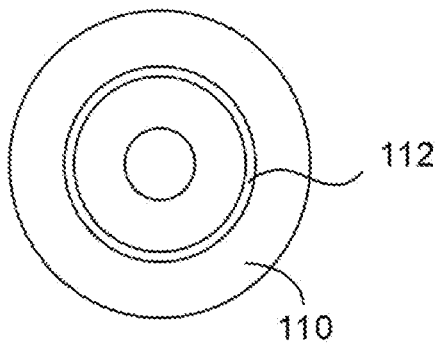
FIG. 20 shows a computer program product comprising a computer readable storage medium with computer program code for implementing functionality of the communication device and/or the network device.

The computer program code of a mobile equipment may be stored in the form of computer program product for instance in the form of a computer readable storage medium, such as a CD ROM disc or a memory stick. In this case the computer readable storage medium carries a computer program with the computer program code, which will implement the functionality of the above-described communication device and/or the network device. One such computer readable storage medium 110 with computer program code 112 is schematically shown in FIG. 20, but it can also, for example, be a non-volatile memory related to the EAP-AKA' module 52.

Alternatively, instead of being enabled through a computer program, the respective method may be fully or partially enabled through a hardware processor, such as an ASIC or PFGA or baseband module comprised in the communication device, network device, network system, peer, and server respectively.

Figure 21:
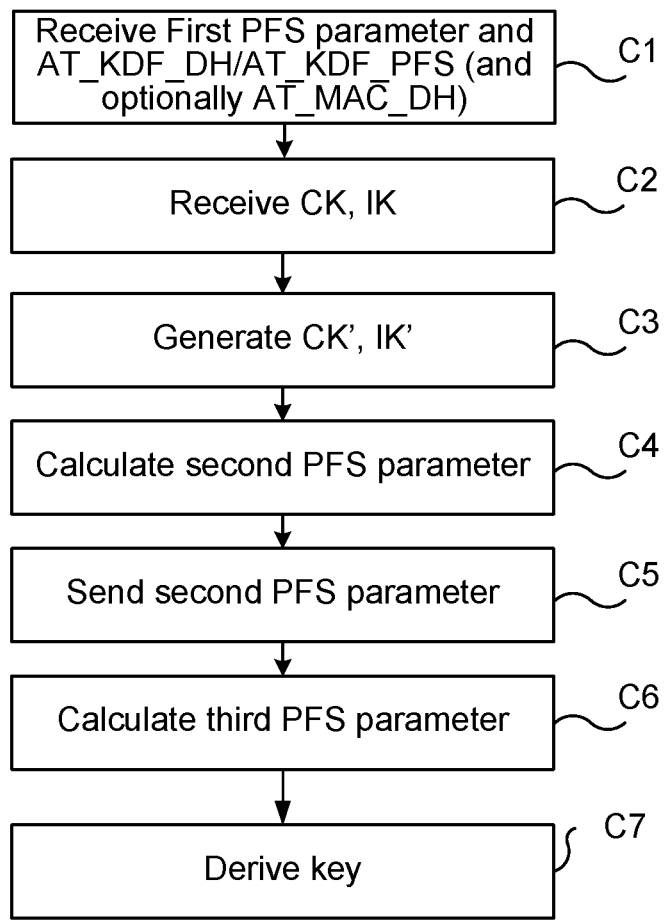
FIG. 21 is a flowchart for a method performed by a communication device.

FIG. 21 discloses a method performed by the communication device 40 during the EAP-AKA' procedure. In an action C1, a first PFS parameter value and at least one attribute value indicating a choice of a Diffie-Hellman group are received from the network device. The first PFS parameter is in the embodiment of FIG. 2 the parameter value $G^{\wedge}x$ contained in the attribute AT_GX, and in the embodiment of FIG. 3 it is a public key of a public-private key pair of network device/server. The attribute value is in the embodiment of FIG. 2 the value of AT_KDF_DH and in the embodiment of FIG. 3 the value of AT_KDF_PFS. The attribute value may thus also indicate a KDF. The Diffie-Hellman group is in one embodiment a 1024-bit MODP group specified in Appendix B.2 of IETF RFC 7296 and in another embodiment an Elliptic Curve Diffie-Hellman Ephemeral group, e.g. a Curve25519 group as specified in IETF RFC 8031. The communication device may in an embodiment also receive from the network device an attribute value indicating use of the message authentication code applicable for PFS parameter negotiation in EAP-AKA' and wherein the attribute value indicates that a Message Authentication Code has been calculated over a whole Extensible Authentication Protocol, EAP, packet containing an EAP header, an EAP-AKA' header and attribute values including the first PFS parameter value.

In a second action C2 it receives the CK and IK. The CK and IK are output from e.g. the USIM/identity module of the communication device to the ME or the EAP-AKA' module 52 of the communication unit. The UICC is generally physically connected to the ME, i.e. is generally a part of the communication device.

In a third action C3, the communication device/ME/EAP-AKA' module generates the CK' and IK' based on CK, IK and the access network identity as mentioned above.

In a fourth action C4, the communication device calculates a second PFS parameter value. The second PFS parameter value is in the embodiment of FIG. 2 the value of G^y contained in the attribute AT_GY, and in the embodiment of FIG. 3 a public key of a public-private key pair for the communication device. The public key for the communication device is contained in the AT_PUB_ECDHE attribute.

In a fifth action C5, the communication device sends the second PFS parameter to the network device.

In a sixth action C6, the communication device calculates a third PFS parameter value, which in an embodiment is a Diffie-Hellman parameter. The third PFS parameter value is in the embodiment of FIG. 2 the value of G^xy, and in the embodiment of FIG. 3 the shared secret. The third PFS parameter value may be based also on a private key of the public-private key pair for the communication device. The third PFS parameter value is calculated based on (at least) the first PFS parameter value and the second PFS parameter value.

In a seventh action C7, the communication device derives, using a Pseudo-random function, a key for communication between the communication device and the network device or any other network device associated with the network device, based on the third PFS parameter value, the CK', the IK' and an identity associated with the communication device. The identity associated with the communication device is in one embodiment a NAI associated with the communication device and in another the IMSI associated with the communication device. The key may also be based on an eight or twelve-character long ASCII string representing an EAP-AKA' value. The key may be EMSK in some embodiments, e.g. when the EAP-AKA' value is a twelve-character long ASCII string.

It should be understood that all the actions C1-C7 above may not be done in exactly the same order as presented above. For example, the CK and IK can be received and CK', IK' can be generated before the reception of the parameter values in action C1. The calculation of the second PFS parameter is action C4 can also be done before action C1. Another example is that the calculation of the third PFS parameter and the derivation of the key in actions C6 and C7 may take place before the sending of the second PFS parameter in action C5.

Figure 22:
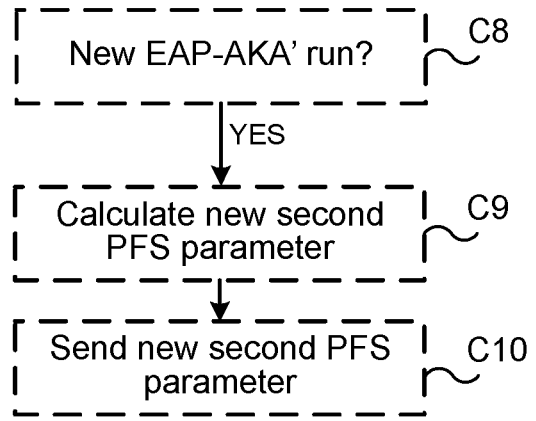
FIG. 22 illustrates additional further actions of the method of FIG. 21.

FIG. 22 illustrates an embodiment of the method illustrated with FIG. 21. In this embodiment, the communication device calculates the second PFS parameter value and sends the second PFS parameter value to the network device each time the communication device performs the EAP-AKA' procedure.

Figure 23:
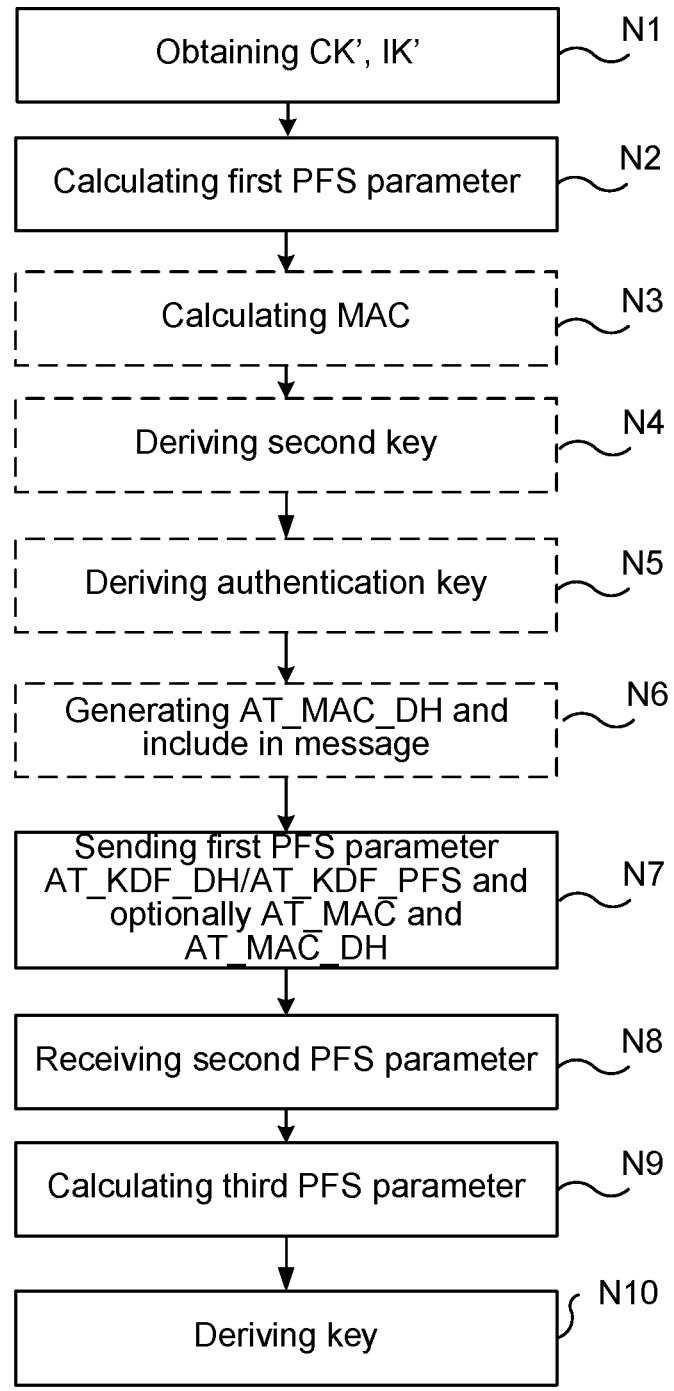
FIG. 23 is a flowchart illustrating a method performed by a network device.

FIG. 23 illustrates a method performed by the network device during an EAP-AKA', procedure. In a first action N1 the network device obtains the CK' and IK', which are based on the CK, IK and an access network identity. The CK' and IK' is in one embodiment received from an HSS.

In a second action N2, the first PFS parameter value is calculated by the network device. The first PFS parameter value is in one embodiment a public key of a public-private key pair for the network device.

In an optional third action N3, a MAC is calculated.

In an optional fourth action N4, a second key is generated by the network device before the second PFS parameter value has been received from the communication device. The second key, which in one embodiment is the MK_pre, may be derived based on only the CK', the IK', the EAP-AKA' attribute value and the identity associated with the communication device.

In an optional fifth action N5, the network device derives an authentication key. The authentication key is derived from the from the second key.

In a sixth, optional action N6, the network device generates AT_MAC_DH and include it in a first EAP-Request/AKA'-Challenge message sent in a seventh action N7. The MAC_DH in the attribute AT_MAC_DH may be calculated over a whole EAP packet containing an EAP header, an EAP-AKA' header and attribute values including the first PFS parameter value.

In the seventh action N7, the network device sends the first PFS parameter value and at least one attribute value indicating a choice of a Diffie-Hellman group to a communication device. The at least one attribute value may also indicate a key derivation function and the attribute value is in the embodiment of FIG. 2 the value of AT_KDF_DH and in the embodiment of FIG. 3 the value of AT_KDF_PFS. The Diffie-Hellman group is in one embodiment a 1024-bit MODP group specified in Appendix B.2 of IETF RFC 7296 and in another embodiment an Elliptic Curve Diffie-Hellman Ephemeral group, e.g. a Curve25519 group as specified in IETF RFC 8031.

It may optionally also send the attributes AT_MAC and AT_MAC_DH to the communication device.

In an eighth action N8, the network node receives the second PFS parameter value from the communication device. The second PFS parameter value may be a public key of a public-private key pair for the communication device.

In a ninth action N9, the network device calculates the third PFS parameter value based on the first PFS parameter value, which may be a Diffie-Hellman value, and the second PFS parameter value. The third PFS parameter value may also be based on a private key of the public-private key pair for the communication device in an embodiment where public keys are exchanged between the communication device and network device.

In a tenth action N10, the network device derives, using a Pseudo-random function, a key for communication between the communication device and the network device or any other network device associated with the network device, based on the third PFS parameter value, the CK', the IK', and the identity associated with the communication device. The identity associated with the communication device is in one embodiment its Network Access Identifier, NAI, or a part of the NAI, but may in another embodiment be the IMSI associated with the communication device. In an embodiment, the key is derived also based on an ASCII string representing an EAP-AKA' value, which ASCII string in one embodiment is eight characters long and in another embodiment twelve characters long.

Again, it should be understood that all the actions N1-N10 above may not be done in exactly the same order as presented above.

Figure 24:
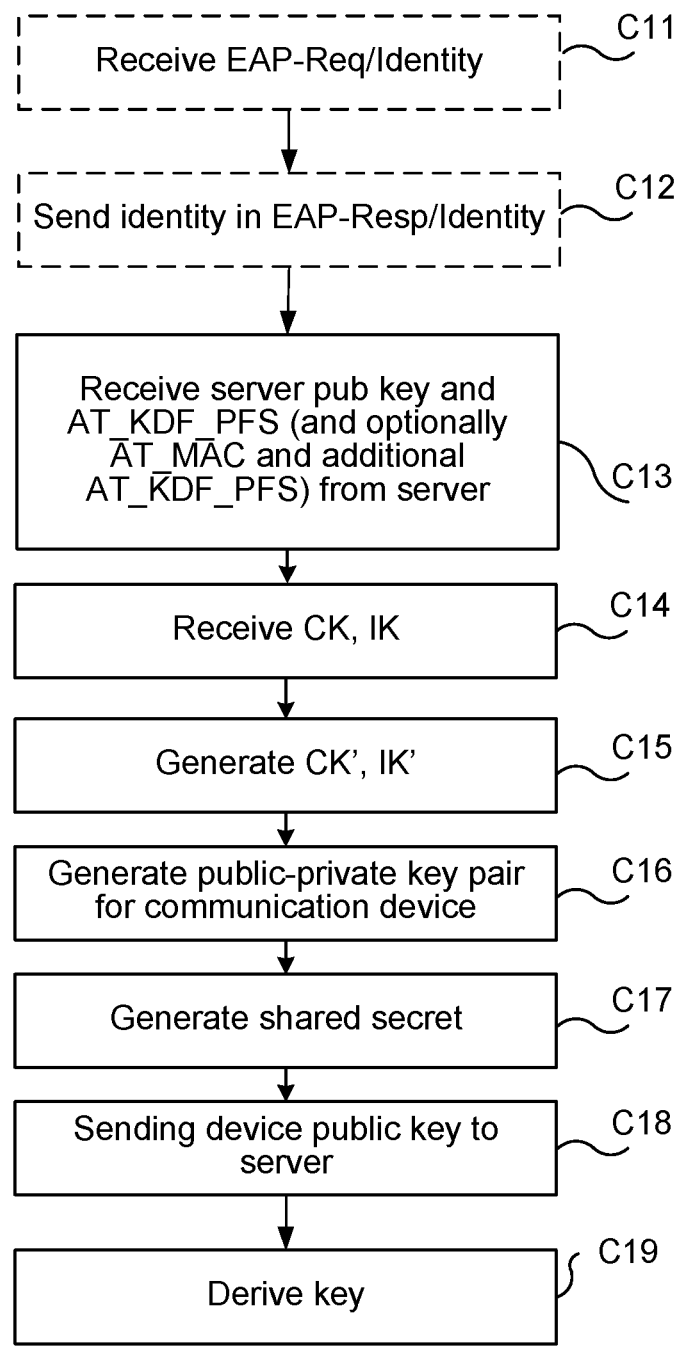
FIG. 24 is a flowchart illustrating a method performed by a communication device.

FIG. 24 illustrates a method performed by the communication device 40 during EAP-AKA' with a server and according to the embodiment of FIG. 2. In a first, optional, action C11 of the method, the communication device receives an EAP-Request/Identity message from the server.

In a second optional action C12, the communication device sends the identity to the network device in an EAP-Response/Identity message.

In a third action C13, the communication device receives from the server, a message comprising a public key of a public-private key pair for the server, and an attribute indicating (1) a used or desired key generation function associated with the public key for the server, and (2) a used or desired Elliptic Curve Diffie-Hellman Ephemeral group related to the public key for the server. The message may with advantage be an EAP-Request/AKA'-Challenge. The public key of the server may be contained in the attribute AT_PUB_ECDHE. The Elliptic Curve Diffie-Hellman Ephemeral group is in one embodiment a Curve25519 group as specified in IETF RFC 8031. The communication device may also receive a MAC attribute (AT_MAC) from the server, where the MAC attribute protects the public key for the server and the attribute that indicates a used or desired key generation function associated with the public key and a used or desired Elliptic Curve Diffie-Hellman Ephemeral group related to the public key for the server. The communication device may receive two or more attributes from the server, wherein each one of the attributes indicates both a choice of an Elliptic Curve Diffie-Hellman Ephemeral group and key derivation function for the derivation of the key.

In a fourth action C14, the communication device receives the CK, IK from a USIM.

In a fifth action C15, the communication device generates CK' and IK' based on the CK, IK and an access network identity.

In a sixth action C16, the communication device generates a public-private key pair for the communication device.

In a seventh action C17, the communication device generates a shared secret based on a private key of the public-private key pair for the communication device and the public key for the server.

In an eighth action C18, the communication device sends the public key for the communication device to the server in order to enable the server to generate the shared secret through generation of the shared secret based on the public key for the communication device and a private key of the public-private key pair for the server.

In a ninth action C19, the communication device derives a key using a pseudo-random function for communication between the communication device and the server based on the shared secret, the CK', the IK', the identity associated with the communication device and a value representing a choice of a key derivation function. The identity associated with the communication device is in an embodiment a NAI or a part of a NAI. The value representing a choice of a KDF may be a twelve-character long ASCII string representing an EAP-AKA' value.

Figure 25:
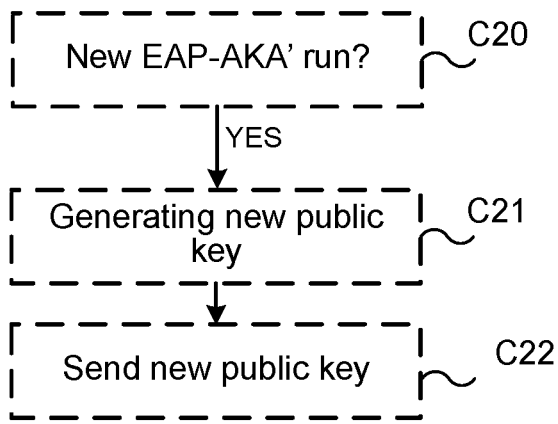
FIG. 25 illustrates additional further actions of the method of FIG. 24.

FIG. 25 illustrates an embodiment of the method illustrated with FIG. 24. In this embodiment, the communication device generates a new public key for the communication device, and sends the public key for the communication device to the server each time the communication device performs the EAP-AKA' procedure.

It should be understood that all the actions C11-C19 may not be done in exactly the same order as presented above. For example, the CK and IK can be received and CK', IK' can be generated before the reception of the parameter values in action C13. The generation of the public-private key pair for the communication device in action C16 can also be done before action C11-C15. Another example is that the sending of the public key for the communication device to the server may take place before the generation of the shared secret. Yet another example is that the derivation of the key in C19 may take place before the action C18.

Figure 26:
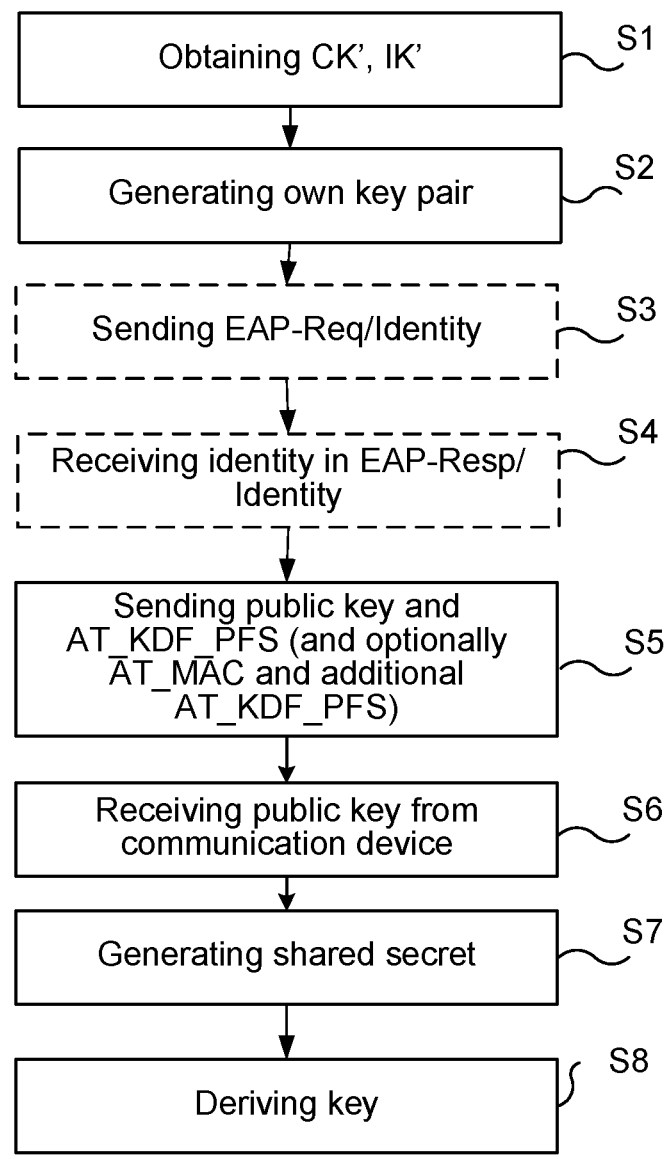
FIG. 26 is a flowchart illustrating a method performed by a server.

FIG. 26 illustrates a method performed by a server during EAP-AKA' procedure with a communication device. This method is also in line with the embodiment disclosed in FIGS. 3a-3b. In a first action S1, the server obtains the CK' and IK', which are based on CK, IK and an access network identity.

In a second action S2, the server generates a public-private key pair for itself.

In a third, optional action S3, the server sends an EAP-Request/Identity message to the communication device 40.

In a fourth, optional action S4, the server receives the identity of the communication device in an EAP-Response/Identity message. The identity associated with the communication device is in one embodiment a NAI, or a part of the NAI.

In a fifth action S5, the server sends to the communication device, a public key of the public-private key pair for the server and an attribute indicating (1) a used or desired key generation function associated with the public key for the server, and (2) a used or desired ECDHE group related to the public key for the server. The ECDHE group may be a Curve25519 group as specified in IETF RFC 8031. The server may in this action S5 also send a MAC attribute to the communication device, where the MAC attribute protects the public key for the server and the attribute that indicates a used or desired key generation function associated with the public key and a used or desired Elliptic Curve Diffie-Hellman Ephemeral group related to the public key for the server. The server may send at least two attributes, wherein each of the attribute indicates both a choice of an Elliptic Curve Diffie-Hellman Ephemeral group and key derivation function for the derivation of the key.

In a sixth action S6, the server receives from the communication device a public key of a public-private key pair for the communication device.

In a seventh action S7, the server generates a shared secret based on a private key of the public-private key pair for the server and the received public key for the communication device.

In an eighth action S8, the server derives a key, e.g. EMSK, using a pseudo-random function for communication between the communication device and the server. The key is derived based on the shared secret, the CK', the IK', an identity associated with the communication device and a value representing a choice of a key derivation function. The value representing a choice of a key derivation function is in one embodiment, such as in the case the EMSK shall be derived, a twelve-character long ASCII string representing an EAP-AKA' value.

The embodiments should now have been sufficiently described and some of the changes in relation to prior art and/or extensions to EAP-AKA' are:

1. Application of the idea to EAP-AKA' (and EAP-AKA) rather than AKA directly.

2. Inclusion of the entire packet and all attributes in a protocol. Instead of "MAC over gx", embodiments herein uses an EAP version with "MAC over all", the attributes AT_GX/AT_PUB_ECDHE included.

3. The use of this new extension is backwards compatible by including both legacy MAC and other attributes and the DH attributes from the server/network, and letting the peer/UE decide which one it wants to execute. This saves a roundtrip that would otherwise be needed for negotiation.

4. Providing bidding-down protection by including new things in a way that integrity protection in an older version algorithm protects the new things, even if the older version doesn't understand the new things.

5. In embodiments utilizing AT_MAC_DH, the algorithm to calculate and use two separate MAC values when one doesn't know which ones the peer wants or can use. A problem is, that to take a MAC value of a message that ultimately includes the MAC value itself, one has to revert to special tricks to ensure that MAC can be calculated. Normally protocols do this in one of two ways, either taking the MAC of the message that does not include the MAC value or attribute carrying it at all. Or, zeroing out the actual MAC value when calculating the MAC value.

However, some embodiments only carry one MAC value. A key obstacle is that we cannot change the behaviour of the receiver who only understands the legacy version of a MAC attribute. This is what is done in at least one of the embodiments for two MAC values:

zero out both MAC values, calculate newest/most recent extension MAC value, and place the result in the corresponding MAC attribute, calculate the oldest/base MAC value, and place the result in the corresponding MAC attribute, then, in reception, if one only knows the old MAC attribute, the usual calculation succeeds (zero out that attribute, recalculate and compare to received value);

or, if one knows the new attribute, zero out both attributes, and calculate the value and compare with received value.

REFERENCES MENTIONED BETWEEN SQUARE BRACKETS

[RFC2104] Krawczyk, H., Bellare, M., and R. Canetti, "HMAC: Keyed-Hashing for Message Authentication", RFC 2104, DOI 10.17487/RFC2104, February 1997, <https://www.rfc editor.org/info/rfc2104>.

[RFC2119] Bradner, S., "Key words for use in RFCs to Indicate Requirement Levels", BCP 14, RFC 2119, DOI 10.17487/RFC2119, March 1997, <https://www.rfc-editor.org/info/rfc2119>.

[RFC4187] Arkko, J. and H. Haverinen, "Extensible Authentication Protocol Method for 3rd Generation Authentication and Key Agreement (EAP-AKA)", RFC 4187, DOI 10.17487/RFC4187, January 2006, <https://www.rfc-editor.org/info/rfc4187>.

[RFC5448] Arkko, J., Lehtovirta, V., and P. Eronen, "Improved Extensible Authentication Protocol Method for $3^{rd}$ Generation Authentication and Key Agreement (EAP-AKA)", RFC 5448, DOI 10.17487/RFC5448, May 2009, <https://www.rfc-editor.org/info/rfc5448>.

[RFC7296] Kaufman, C., Hoffman, P., Nir, Y., Eronen, P., and T. Kivinen, "Internet Key Exchange Protocol Version 2 (IKEv2)", STD 79, RFC 7296, DOI 10.17487/RFC7296, October 2014, <https://www.rfc-editor.org/info/rfc7296>.

[RFC4186] Haverinen, H., Ed. and J. Salowey, Ed., "Extensible Authentication Protocol Method for Global System for Mobile Communications (GSM) Subscriber Identity Modules (EAP-SIM)", RFC 4186, DOI 10.17487/RFC4186, January 2006, <https://www.rfc-editor.org/info/rfc4186>.

[RFC7748] Langley, A., Hamburg, M., and S. Turner, "Elliptic Curves for Security", RFC 7748, DOI 10.17487/RFC7748, January 2016, <https://www.rfc-editor.org/info/rfc7748>.

[RFC8031] Nir, Y. and S. Josefsson, "Curve25519 and Curve448 for the Internet Key Exchange Protocol Version 2 (IKEv2) Key Agreement", RFC 8031, DOI 10.17487/RFC8031, December 2016, <https://www.rfc-editor.org/info/rfc8031>.

[TrustCom2015] Arkko, J., Norrman, K., Naslund, M., and B. Sahlin, "A USIM compatible 5G AKA protocol with perfect forward secrecy", August 2015 in Proceedings of the TrustCom 2015, IEEE.

[CB2014] Choudhary, A. and R. Bhandari, "3GPP AKA Protocol: Simplified Authentication Process", December 2014, International Journal of Advanced Research in Computer Science and Software Engineering, Volume 4, Issue 12.

[MT2012] Mjolsnes, S. and J-K. Tsay, "A vulnerability in the UMTS and LTE authentication and key agreement protocols", October 2012, in Proceedings of the 6th international conference on Mathematical Methods, Models and Architectures for Computer Network Security: computer network security.

[BT2013] Beekman, J. and C. Thompson, "Breaking Cell Phone Authentication: Vulnerabilities in AKA, IMS and Android", August 2013, in 7th USENIX Workshop on Offensive Technologies, WOOT '13.

[Heist2015] Scahill, J. and J. Begley, "The great SIM heist", February 2015, in https://firstlook.org/theintercept/2015/02/19/great-sim-heist/.

[DOW1992] Diffie, W., vanOorschot, P., and M. Wiener, "Authentication and Authenticated Key Exchanges", June 1992, in Designs, Codes and Cryptography 2 (2): pp. 107-125.

The invention claimed is:

1. A method performed by a communication device during an Extensible Authentication Protocol-Authentication and Key agreement prime, EAP-AKA', procedure with a server, the method comprising:

receiving, from the server, a message comprising a public key of a public-private key pair for the server, and an attribute indicating a used or desired key generation function associated with the public key for the server, and a used or desired Elliptic Curve Diffie-Hellman Ephemeral group related to the public key for the server;

receiving a ciphering key, CK, and an integrity key, IK, from a Universal Subscriber Identity Module;

generating a modified ciphering key, CK', and a modified integrity key, IK', based on the CK, IK and an access network identity;

generating a public-private key pair for the communication device;

generating a shared secret based on a private key of the public-private key pair for the communication device and the public key for the server;

sending the public key for the communication device to the server in order to enable the server to generate the shared secret through generation of the shared secret based on the public key for the communication device and a private key of the public-private key pair for the server; and deriving a key using a pseudo-random function for communication between the communication device and the server, based on the shared secret, the CK', the IK', an identity associated with the communication device and a value representing a choice of a key derivation function.

2. A method according to claim 1, wherein the message is an EAP-Request/AKA'-Challenge.

3. A method according to claim 1, wherein the identity associated with the communication device is a Network Access Identifier, NAI, or a part of the NAI.

4. A method according to claim 1, wherein the value representing a choice of a key derivation function is a twelve-character long ASCII string representing an EAP-AKA' value.

5. A method according to claim 1, wherein the Elliptic Curve Diffie-Hellman Ephemeral group is a Curve25519 group as specified in IETF RFC 8031.

6. A method according to claim 1, comprising generating and sending the public key for the communication device to the server each time the communication device performs the EAP-AKA' procedure.

7. A method according to claim 1, comprising receiving a Message Authentication Code attribute from the server, where the Message Authentication Code attribute protects the public key for the server and the attribute that indicates a used or desired key generation function associated with the public key and a used or desired Elliptic Curve Diffie-Hellman Ephemeral group related to the public key for the server.

8. A method according to claim 1, comprising:
receiving an EAP-Request/Identity message from the server, and
sending the identity to the server in an EAP-Response/Identity message.

9. A method according to claim 1, wherein at least two attributes are received from the server, wherein each one of the attributes indicates both a choice of an Elliptic Curve Diffie-Hellman Ephemeral group and key derivation function for the derivation of the key.

10. A communication device, wherein the communication device comprises a processor and a memory, said memory comprising instructions executable by the processor, whereby said communication device is operative, during an Extensible Authentication Protocol-Authentication and Key agreement prime, EAP-AKA', procedure with a server, to:
receive, from a server, a first message comprising a public key of a public-private key pair for the server, and an attribute indicating
a used or desired key generation function associated with the public key for the server and
a used or desired Elliptic Curve Diffie-Hellman Ephemeral group related to the public key for the server;
receive a ciphering key, CK, and an integrity key, IK, from a Universal Subscriber Identity Module;
generating a modified ciphering key, CK', and a modified integrity key, IK', based on the CK, IK and an access network identity;
generate a public-private key pair for the communication device;
generate a shared secret based on a private key of the public-private key pair for the communication device and the public key for the server;
send the public key for the communication device to the server in order to enable the server to generate the shared secret through generation of the shared secret based on the public key for the communication device and a private key of the public-private key pair for the server; and
derive a key using a pseudo-random function for communication between the communication device and the server, based on the shared secret, the CK', the IK', an identity associated with the communication device and a value representing a choice of a key derivation function.

11. A server comprising a processor and a memory, said memory comprising instructions executable by said processor, whereby said server is operative during an Extensible Authentication Protocol—Authentication and Key agreement prime, EAP-AKA', procedure to:
obtain a modified ciphering key, CK', and a modified integrity key, IK', based on a ciphering key, CK, and an integrity key, IK, and an access network identity;
generate a public-private key pair for the server;
send a public key of the public-private key pair for the server to a communication device and an attribute indicating
a used or desired key generation function associated with the public key for the server, and
a used or desired Elliptic Curve Diffie-Hellman Ephemeral group related to the public key for the server;
receive from the communication device a public key of a public-private key pair for the communication device;
generate a shared secret based on a private key of the public-private key pair for the server and the received public key for the communication device;
derive a key using a pseudo-random function for communication between the communication device and the server, based on the shared secret, the CK', the IK', an identity associated with the communication device and a value representing a choice of a key derivation function.

12. A method performed by a server during an Extensible Authentication Protocol—Authentication and Key agreement prime, EAP-AKA' procedure with a communication device, the method comprising:
obtaining a modified ciphering key, CK', and a modified integrity key, IK', based on a ciphering key, CK, and an integrity key, IK, and an access network identity;
generating a public-private key pair for the server;
sending, to a communication device, a public key of the public-private key pair for the server and an attribute indicating
a used or desired key generation function associated with the public key for the server, and
a used or desired Elliptic Curve Diffie-Hellman Ephemeral group related to the public key for the server;
receiving from the communication device a public key of a public-private key pair for the communication device;
generating a shared secret based on a private key of the public-private key pair for the server and the received public key for the communication device; and
deriving a key using a pseudo-random function for communication between the communication device and the server, based on the shared secret, the CK', the IK', an identity associated with the communication device and a value representing a choice of a key derivation function.

13. A method according to claim 12, wherein the identity associated with the communication device is a Network Access Identifier, NAI, or a part of the NAI.

14. A method according to claim 12, wherein the value representing a choice of a key derivation function is a twelve-character long ASCII string representing an EAP-AKA' value.

15. A method according to claim 12, wherein the Elliptic Curve Diffie-Hellman Ephemeral group is a Curve25519 group as specified in IETF RFC 8031.

16. A method according to claim 12, comprising sending a Message Authentication Code attribute to the communication device, where the Message Authentication Code attribute protects the public key for the server and the attribute that indicates a used or desired key generation function associated with the public key and a used or desired Elliptic Curve Diffie-Hellman Ephemeral group related to the public key for the server.

17. A method according to claim 12, comprising:
sending an EAP-Request/Identity message to the communication device, and
receiving the identity associated with the communication device in an EAP-Response/Identity message from the communication device.

18. A method according to claim 12, wherein at least two attributes are sent by the server to the communication device, wherein each one of the at least two attributes indicates both a choice of an Elliptic Curve Diffie-Hellman Ephemeral group and key derivation function for the derivation of the key.

* * * * *

UNITED STATES PATENT AND TRADEMARK OFFICE
CERTIFICATE OF CORRECTION

PATENT NO. : 11,228,429 B2
APPLICATION NO. : 16/303346
DATED : January 18, 2022
INVENTOR(S) : Arkko et al.

It is certified that error appears in the above-identified patent and that said Letters Patent is hereby corrected as shown below:

In the Specification

In Column 2, Line 48, delete "Security" and insert -- Secrecy --, therefor.

In Column 2, Line 55, delete "WO-20161137374-A1" and insert -- WO-2016/137374-A1 --, therefor.

In Column 2, Line 63, delete "share key" and insert -- shared key --, therefor.

In Column 4, Line 3, delete "from the network device from the network device;" and insert -- from the network device; --, therefor.

In Column 4, Line 41, delete "EPA-AKA'" and insert -- EAP-AKA' --, therefor.

In Column 9, Line 27, delete "according" and insert -- according to --, therefor.

In Column 9, Line 67, delete "IEIF" and insert -- IETF --, therefor.

In Column 12, Line 21, delete "eavesdropping the" and insert -- eavesdropping on the --, therefor.

In Column 12, Line 63, delete "through by" and insert -- by --, therefor.

In Column 13, Line 44, delete "used, Such" and insert -- used. Such --, therefor.

In Column 13, Line 64, delete "form" and insert -- from --, therefor.

In Column 14, Line 58, delete "|determined" and insert -- determined --, therefor.

In Column 14, Line 63, delete "FIG. 3*a-b*" and insert -- FIGS. 3*a-b* --, therefor.

Signed and Sealed this
Twenty-fourth Day of May, 2022

Katherine Kelly Vidal
*Director of the United States Patent and Trademark Office*

CERTIFICATE OF CORRECTION (continued)
U.S. Pat. No. 11,228,429 B2

In Column 17, Line 45, delete "a an" and insert -- an --, therefor.

In Column 18, Line 44, delete "LANA." and insert -- IANA. --, therefor.

In Column 20, Line 29, delete "(K, S|0x01)" and insert -- (K, |S|0x01) --, therefor.

In Column 21, Line 42, delete "Where" and insert -- where --, therefor.

In Column 21, Line 63, delete "follows." and insert -- follows: --, therefor.

In Column 22, Line 49, delete "in in" and insert -- in --, therefor.

In Column 22, Line 58, delete "the assume" and insert -- then assume --, therefor.

In Column 24, Line 61, delete "that that" and insert -- that --, therefor.

In Column 25, Line 53, delete "provided." and insert -- be provided. --, therefor.

In Column 26, Line 13, delete "properties of related" and insert -- properties related --, therefor.

In Column 26, Line 19, delete "expose" and insert -- exposure --, therefor.

In Column 27, Line 50, delete "Generation" and insert -- generation --, therefor.

In Column 27, Line 61, delete "(WLAN)." and insert -- (WLANs). --, therefor.

In Column 28, Line 44, delete "(KDF)," and insert -- (KDFs), --, therefor.

In Column 28, Line 45, delete "(MAC)" and insert -- (MACs) --, therefor.

In Column 29, Line 8, delete "base station BS" and insert -- base station (BS) --, therefor.

In Column 29, Line 17, delete "network 46" and insert -- network 38 --, therefor.

In Column 29, Line 25, delete "WN" and insert -- WN1 --, therefor.

In Column 30, Line 36, delete "antenna 50$a$." and insert -- antenna 50A. --, therefor.

In Column 30, Line 41, delete "antenna 50$a$" and insert -- antenna 50A --, therefor.

In Column 30, Line 42, delete "Antenna 50$a$" and insert -- Antenna 50A --, therefor.

In Column 31, Line 48, delete "on" and insert -- of --, therefor.

In Column 32, Line 38, delete "PFGA" and insert -- FPGA --, therefor.

CERTIFICATE OF CORRECTION (continued)
U.S. Pat. No. 11,228,429 B2

In Column 33, Line 49, delete "is" and insert -- in --, therefor.

In Column 34, Line 13, delete "from the from the" and insert -- from the --, therefor.

In Column 37, Line 51, delete "(EAP-AKA)"," and insert -- (EAP-AKA')", --, therefor.